US010531107B2

(12) United States Patent
Tsukagoshi

(10) Patent No.: US 10,531,107 B2
(45) Date of Patent: Jan. 7, 2020

(54) CODING APPARATUS, CODING METHOD, TRANSMISSION APPARATUS, AND RECEPTION APPARATUS

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 704 days.

(21) Appl. No.: 14/914,227

(22) PCT Filed: Aug. 8, 2014

(86) PCT No.: PCT/JP2014/071098
§ 371 (c)(1),
(2) Date: Feb. 24, 2016

(87) PCT Pub. No.: WO2015/045647
PCT Pub. Date: Apr. 2, 2015

(65) Prior Publication Data
US 2016/0301940 A1 Oct. 13, 2016

(30) Foreign Application Priority Data

Sep. 24, 2013 (JP) .................................. 2013-197350

(51) Int. Cl.
*H04N 19/31* (2014.01)
*H04N 19/70* (2014.01)
(Continued)

(52) U.S. Cl.
CPC ......... *H04N 19/31* (2014.11); *H04L 65/4069* (2013.01); *H04L 65/607* (2013.01);
(Continued)

(58) Field of Classification Search
CPC . H04L 65/4069; H04L 65/607; H04N 19/105; H04N 19/162; H04N 19/187;
(Continued)

(56) References Cited

U.S. PATENT DOCUMENTS

2002/0051581 A1 5/2002 Takeuchi et al.
2002/0191625 A1\* 12/2002 Kelly .................... H04L 47/564
370/412
(Continued)

FOREIGN PATENT DOCUMENTS

JP  2002-010251 A  1/2002
JP  2006-245756 A  9/2006
(Continued)

OTHER PUBLICATIONS

Schierl et al., Scalable Video Coding Over RTP and MPEG-2 Transport Stream in Broadcase and IPTV Channels, 2009, IEEE, pp. 64-71.\*

(Continued)

*Primary Examiner* — Christopher S Kelley
*Assistant Examiner* — Kathleen M Walsh
(74) *Attorney, Agent, or Firm* — Oblon, McClelland, Maier & Neustadt, L.L.P.

(57) ABSTRACT

To perform favorable decoding processing on the receiver side.
By an image coding unit, image data of each picture constituting moving image data is classified into a plurality of hierarchies, the image data of the picture in each of the classified hierarchies is coded, the plurality of hierarchies is divided into a predetermined number of hierarchy sets, and a predetermined number of video streams having the coded image data of the picture in each of the divided hierarchy sets is generated. In this case, coding is performed so that a decoding interval of at least the coded image data of the picture in the lowest hierarchy set is a regural interval. By a transmission unit, a container including the generated predetermined number of video streams in a predetermined format is transmitted.

17 Claims, 31 Drawing Sheets

(51) Int. Cl.
| | |
|---|---|
| *H04L 29/06* | (2006.01) |
| *H04N 19/46* | (2014.01) |
| *H04N 19/187* | (2014.01) |
| *H04N 19/105* | (2014.01) |
| *H04N 19/162* | (2014.01) |
| *H04N 19/169* | (2014.01) |

(52) U.S. Cl.
CPC ............. *H04N 19/46* (2014.11); *H04N 19/70* (2014.11); *H04N 19/105* (2014.11); *H04N 19/162* (2014.11); *H04N 19/187* (2014.11); *H04N 19/188* (2014.11)

(58) Field of Classification Search
CPC ...... H04N 19/188; H04N 19/31; H04N 19/46; H04N 19/70
USPC ...................................................... 375/240.02
See application file for complete search history.

(56) References Cited

U.S. PATENT DOCUMENTS

| | | | |
|---|---|---|---|
| 2005/0083401 A1 | 4/2005 | Mizutani et al. | |
| 2009/0252228 A1* | 10/2009 | Boyce ............ | H04N 21/234327 375/240.15 |
| 2011/0164683 A1 | 7/2011 | Takahashi et al. | |
| 2013/0170561 A1* | 7/2013 | Hannuksela ..... | H04N 21/23424 375/240.25 |
| 2013/0195201 A1* | 8/2013 | Boyce .................... | H04N 19/44 375/240.25 |
| 2014/0092953 A1* | 4/2014 | Deshpande ............ | H04N 19/31 375/240.01 |
| 2014/0125762 A1 | 5/2014 | Tsukagoshi | |
| 2015/0124884 A1* | 5/2015 | Yuzawa .................. | H04N 19/70 375/240.16 |
| 2015/0245046 A1* | 8/2015 | Tsukuba .................. | H04N 19/70 375/240.25 |

FOREIGN PATENT DOCUMENTS

| | | |
|---|---|---|
| JP | 2009-506626 A | 2/2009 |
| JP | 2009-267537 A | 11/2009 |
| JP | 2010-258997 A | 11/2010 |
| JP | 2013-106341 A | 5/2013 |
| WO | 2003/075524 A1 | 9/2003 |
| WO | 2010/032636 A1 | 3/2010 |
| WO | WO 2012/023281 A1 | 2/2012 |
| WO | WO 2013/089024 A1 | 6/2013 |

OTHER PUBLICATIONS

Schierl et al., Scalable Video Coding Over RTP and MPEG-2 Transport Stream in Broadcase and IPTV Channels, 2009, IEEE, pp. 64-71. (Year: 2009).*

Japanese Office Action dated Sep. 19, 2017 in Patent Application No. 2016-103835 (without English Translation).

International Search Report dated Nov. 4, 2014, in PCT/JP2014/071098 Filed Aug. 8, 2014.

Schierl, et al., "Scalable Video Coding Over RTP and MPEG-2 Transport Stream in Broadcast and IPTV Channels," IEEE Wireless Communications, vol. 16, No. 5, Oct. 2009, 8 Pages.

Sullivan, et al., "Overview of the High Efficiency Video Coding (HEVC) Standard," IEEE Transactions on Circuits and Systems for Video Technology, vol. 22, No. 12, Dec. 2012, 20 Pages.

Extended European Search Report dated Feb. 24, 2017 in Patent Application No. 14848220.1.

Text of ISO/IEC FDIS 14496-15, "3rd edition Information technology—Coding of audio-visual objects—Part 15: Carriage of NAL unit structured video in the ISO Base Media File Format ", 104. MPEG Meeting; Apr. 22-26, 2013; INCHEON; (Motion Picture Expert Group or ISP/IEC JTC1/SC29/WG11), No. N13478, XP030020228, Jun. 8, 2013, 118 pages.

Combined Office Action and Search Report dated May 3, 2018 in Chinese Patent Application No. 201480051418.3 (with English language translation), 27 pages.

Office Action dated Mar. 22, 2016 in Japanese Patent Application No. 2016-026595.

Office Action dated Mar. 22, 2016 in Japanese Patent Application No. 2016-026596.

Office Action dated Mar. 29, 2016 in Japanese Patent Application No. 2013-197350.

Jill Boyce, et al., "Higher layer syntax to improve support for temporal scalability" Vidyo, Inc. Joint Collaborative Team on Video Coding (JCT-VC) of ITU-T SG16 WP3 and ISO/IEC JTC1/SC29/WG11, Document: JCTVC-D200, Jan. 20-28, 2011, 15 Pages.

Benjamin Bross, et al., "High Efficiency Video Coding (HEVC) text specification draft 10 (for FDIS & Last Call)" Editor, Joint Collaborative Team on Video Coding (JCT-VC) of ITU-T SG16 WP3 and ISO/IEC JTC1/SC29/WG11, Document: JCTVC-L1003_v34, Jan. 14-23, 2013, 7 Pages.

Kazushi Sato, et al., "Consideration of buffer management issues HEVC scalability" Joint Collaborative Team on Video Coding (JCT-VC) of ITU-T SG16 WP3 and ISO/IEC JTC1/SC29/WG11, Document: JCTVC-N0049, Jul. 29-Aug. 2, 2013, 7 Pages.

Office Action dated Apr. 2, 2019 in Japanese Patent Application No. 2018-091095, with unedited computer generated English translation.

Rickard Sjoberg, et al., "High-Level Syntax for Bitstream Extraction", Joint Collaborative Team on Video Coding (JCT-VC) of ITU-T SG16 WP3 and ISO/IEC JTC1/SC29/WG11, Nov. 2011.

Office Action dated Jul. 22, 2019 in Chinese Patent Application No. 201480051418.3 (with unedited computer generated English translation).

* cited by examiner (a)
```
nal_unit_header( ) {                          Descriptor
    forbidden_zero_bit                        f(1)
    nal_unit_type                             u(6)
    nuh_layer_id                              u(6)
    nuh_temporal_id_plus1                     u(3)
}
```

(b)
Semantics

Forbidden_zero_bit    (1bit)
    0 is essential.
Nal_unit_type    (6bits)
    Value is determined for each of following NAL units.

| AUD | VPS | SPS | PPS | PSEI | SLICE | SSEI | EOS |

Nuh_layer_id    (6bits)
    0 is assumed.
Nuh_temporal_id_plus1    (3bits)
    Represents temporal_id.
    Takes values (1 to 7) obtained by adding 1 thereto.
    Value of temporal_id itself is 0 to 6.

FIG.4

GOP top picture

| AUD | VPS | SPS | PPS | PSEI | SLICE | SSEI | EOS |

Other than GOP top picture

| AUD | PPS | PSEI | SLICE | SSEI | EOS |

FIG.5

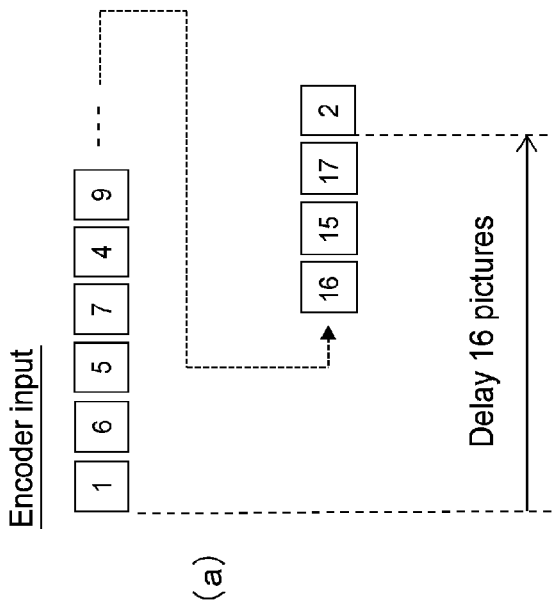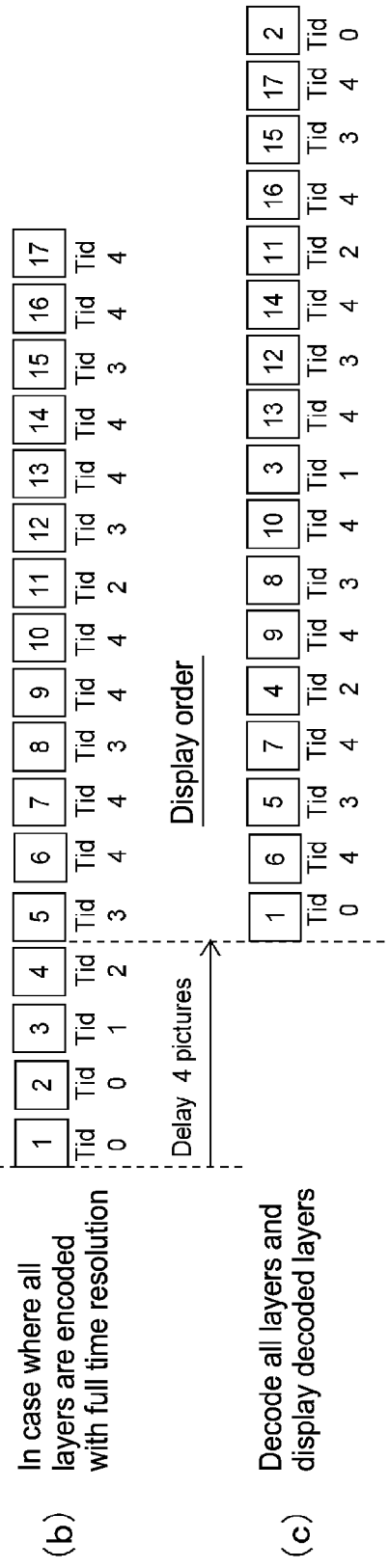
FIG.6

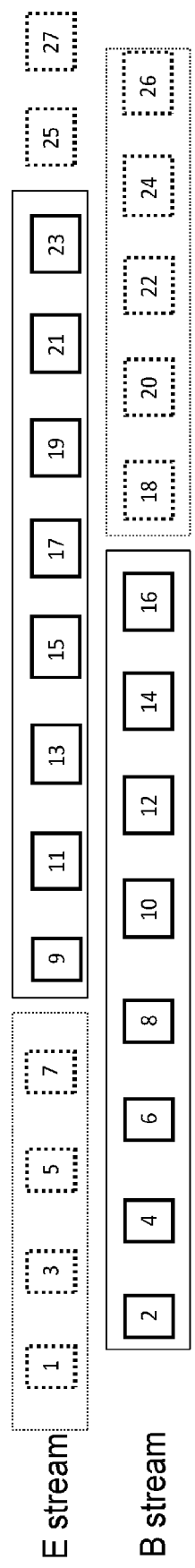
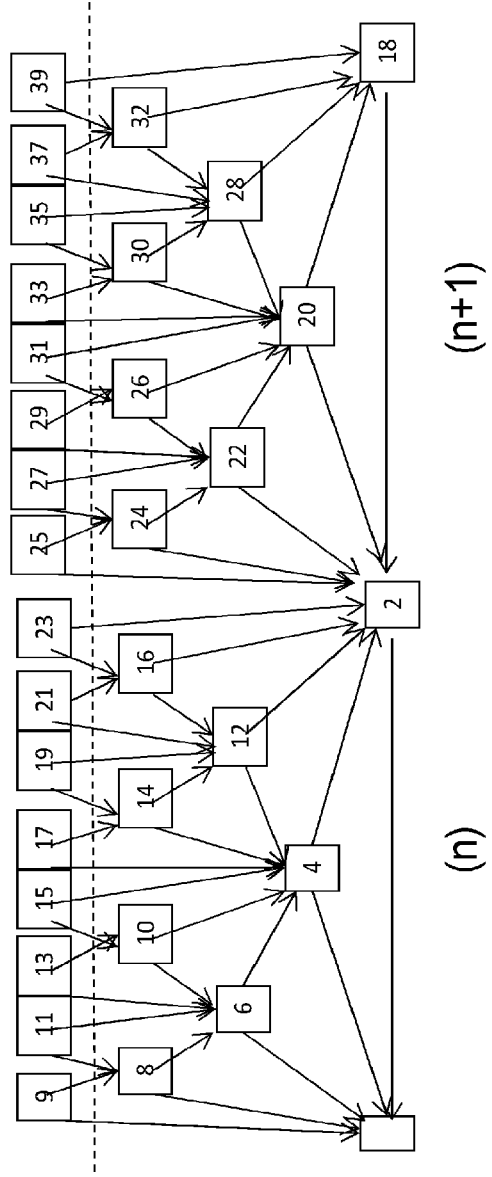
FIG.9

| HEVC_descriptor() { | | |
|---|---|---|
| descriptor_tag | 8 | uimsbf |
| descriptor_length | 8 | uimsbf |
| profile_space | 2 | uimsbf |
| tier_flag | 1 | bslbf |
| profile_idc | 5 | uimsbf |
| reserved_zero_16bits | 16 | bslbf |
| level_idc | 8 | uimsbf |
| profile_compatibility_indication | 32 | bslbf |
| temporal_layer_subset_flag | 1 | bslbf |
| HEVC_still_present_flag | 1 | bslbf |
| HEVC_24hr_picture_present_flag | 1 | bslbf |
| frame_packing_arrangement_SEI_present_flag | 1 | bslbf |
| reserved | 4 | bslbf |
| if ( temporal_layer_subset_flag == '1') { | | |
|     temporal_id_min | 3 | uimsbf |
|     reserved | 5 | bslbf |
|     temporal_id_max | 3 | uimsbf |
|     reserved | 5 | bslbf |
| } | | |
| } | | |

FIG.17

| Syntax | No. of Bits | Format |
|---|---|---|
| Multistream_descriptor ( ) { | | |
|     Multistream_descriptor _tag | 8 | uimslbf |
|     Multistream_descriptor_length | 8 | uimslbf |
|     group_id | 4 | bslbf |
|     stream_dependency_ordering | 4 | bslbf |
|     max_layer_in_group | 4 | bslbf |
|     reserved | 4 | bslbf |
| } | | |

FIG.18

Multistream_descriptor semantics

| | |
|---|---|
| Multistream_descriptor_tag (8bits) | Tag of this descriptor |
| Multistream_descriptor_length (8bits) | Size of this descriptor (number of bytes from next element) |
| group_id (4bits) | ID of group associated in series of services:<br>Base stream and all of non-base (enhanced) streams based thereon have same ID |
| stream_dependency_ordering (4bits) | Define dependence relationship between streams starting from base stream in ascending order |
| 0000 | reserved |
| 0001 | Basic stream |
| 0010 | Second (next to basic stream) stream from basic stream |
| 0011 | Third stream from basic stream |
| .. | |
| max_layer_in_group (4bits) | Maximum value in hierarchy coded in group |
| 0000 | Number of hierarchies is 1 |
| 0001 | Number of hierarchies is 2 |
| .. | |
| 1111 | Number of hierarchies is 16 |

FIG.19

| | Stream_type | Group_id | HEVC descriptor max/min layer | Max_layer_ In_group | Stream_dependency_ orderingr |
|---|---|---|---|---|---|
| Base stream (service1) | 0x24 | 0 | Hierarchies 0 to 2 | 4 | 1 |
| Enhanced stream1 (service1) | 0x25 | 0 | Hierarchy 3 | 4 | 2 |
| Enhanced stream 2 (service1) | 0x25 | 0 | Hierarchy 4 | 4 | 3 |
| Base stream (service2) | 0x24 | 1 | Hierarchies 0 to 1 | 3 | 1 |
| Enhanced stream1 (service2) | 0x25 | 1 | Hierarchy 2 | 3 | 2 |
| Enhanced stream2 (service2) | 0x25 | 1 | Hierarchy 3 | 3 | 3 |

FIG.20

CODING APPARATUS, CODING METHOD, TRANSMISSION APPARATUS, AND RECEPTION APPARATUS

TECHNICAL FIELD

The present technology relates to a coding apparatus, a coding method, a transmission apparatus, and a reception apparatus. Specifically, the present technology relates to a coding apparatus and the like that hierarchically code image data of each picture constituting moving image data.

BACKGROUND ART

If service of providing compressed moving images is provided by broadcasting or through the Internet, for example, the upper limit of frame frequencies that can be reproduced is limited depending on the decoding capability of a receiver. Therefore, the service provider needs to take into account the reproduction capability of a widely used receiver to limit the service to a service with a low frame frequency, or to simultaneously provide services with a plurality of frame frequencies, i.e., a high frame frequency and a low frame frequency.

The receiver costs a lot to support the service with a high frame frequency, which is a inhibiting factor for early widespread use of the receiver. If inexpensive receivers dedicated to the service with a low frame frequency only are widely used at the initial stage and the service provider starts the service with a high frame frequency in the future, viewing is not possible in the absence of a new receiver, which is an inhibiting factor for widespread use of the new service.

For example, the time direction scalability in which image data of each picture constituting moving image data is hierarchically coded in h.265/HEVC (High Efficiency Video Coding) has been proposed (see, non-patent document 1). On the receiver side, it is possible to identify the hierarchy of each picture based on a temporal ID (temporal_id) inserted in the header of a NAL (Network Abstraction Layer) unit, and thus to perform selective decoding up to the hierarchy corresponding to the decoding capability.

Non-Patent Document 1: Gary J. Sullivan, Jens-Rainer Ohm, Woo-Jin Han, Thomas Wiegand, "Overview of the High Efficiency Video Coding (HEVC) Standard" IEEE TRANSACTIONS ON CIRCUITS AND SYSTEMS FOR VIDEO TECNOROGY, VOL. 22, NO. 12, pp. 1649-1668, DECEMBER 2012

SUMMARY OF INVENTION

Problem to be Solved by the Invention

It is an object of the present technology to perform favorable decoding processing on the receiver side.

Means for Solving the Problem

The concept of the present technology is a transmission apparatus including an image coding unit configured to classify image data of each picture constituting moving image data into a plurality of hierarchies, to code the image data of the picture in each of the classified hierarchies, to divide the plurality of hierarchies into a predetermined number of hierarchy sets, and to generate a predetermined number of video streams having the coded image data of the picture in each of the divided hierarchy sets, and a transmission unit configured to transmit a container including the generated predetermined number of video streams in a predetermined format, the image coding unit performing coding so that a decoding interval of the coded image data of the picture in at least the lowest hierarchy set is a regural interval.

In the present technology, the image coding unit codes the image data of each picture constituting moving image data, and thus, the predetermined number of video streams are generated. In this case, the image data of each picture constituting moving image data is classified into a plurality of hierarchies and coded. Then, the plurality of hierarchies are divided into a predetermined number of hierarchy sets, and a predetermined number of video streams, each of which has the coded image data of the picture in the divided hierarchy set, are generated.

In the image coding unit, coding is performed so that a decoding interval of at least the coded iamge data of the picture in the lowest hierarchy set is a regular interval. For example, the image coding unit may perform coding so that a decoding timing for the coded image data of the picture in a hierarchy set higher than the lowest hierarchy set is an average timing of decoding timings for the coded image data of the picture in all of the hierarchy sets lower than the hierarchy set. Accordingly, for example, it allows the receiver to sequentially and smoothly perform decoding processing on each picture in the case where the receiver has the decoding capability to decode the coded image data of the picture not only in the lowest hierarchy set but also in a hierarchy set higher than that.

Moreover, for example, the image coding unit may divide the plurality of hierarchies into the predetermined number of hierarchy sets so that the lowest hierarchy set includes a plurality of hierarchies and a hierarchy set higher than the lowest hierarchy set includes one hierarchy. Accordingly, for example, in the case where the receiver has the decoding capability to perform processing on the coded image data of the pictures in the plurality of hierarchies of the lowest hierarchy set, it only needs the configuration that selects only a video stream having the coded image data of the picture in the lowest hierarchy set, takes it in a buffer, and performs decoding processing on it, and does not need a complex configuration that performs combination processing on a plurality of video streams, for example.

By the transmission unit, a container including the predetermined number of video streams in a predetermined format is transmitted. For example, the container may be a transport stream (MPEG-2 TS) adopted by the digital broadcasting standards. Moreover, for example, the container may be a container in a format such as MP4 used for delivery on the Internet.

As described above, in the present technology, coding is performed so that a decoding interval of at least the coded image data of the picture in the lowest hierarchy set is a regular interval. Therefore, in the case where the receiver has the decoding capability to perform processing on the coded image data of the pictures in the plurality of hierarchies of the lowest hierarchy set, for example, it is possible to continuously and effortlessly perform decoding processing on the coded image data of each picture.

In addition, another concept of the present technology is a transmission apparatus including an image coding unit configured to classify image data of each picture constituting moving image data into a plurality of hierarchies, to code the image data of the picture in each of the classified hierarchies, to divide the plurality of hierarchies into a predetermined number of hierarchy sets, and to generate a predetermined number of video streams having the coded image data of the picture in each of the divided hierarchy sets, a transmission unit configured to transmit a contenner including the generated predetermined number of video streams in a predetermined format, and an identification information insertion unit configured to insert, in a layer of the contenna, identification information for identifying whether each of the predetermined number of video streams is a base stream having the coded image data of the picture in the lowest hierarchy set or an enhanced stream having the coded image data of the picture in a hierarchy set higher than the lowest hierarchy set.

In the present technology, the image coding unit codes the image data of each picture constituting moving image data to generate a predetermined number of video streams. In this case, the image data of each picture constituting moving image data is classified into a plurality of hierarchies and coded. Then, the plurality of hierarchies are divided into a predetermined number of hierarchy sets, and a predetermined number of video streams, each of which has the coded image data of the picture in the divided hierarchy set, are generated.

For example, the image coding unit may perform coding so that a decoding interval of at least the coded image data of the picture in the lowest hierarchy set is a regular interval. In this case, for example, the image coding unit may perfom coding so that a decoding timing for the coded image data of the picture in a hierarchy set higher than the lowest hierarchy set is an average timing of decoding timings for the coded image data of the pictures in all hierarchy sets lower than the hierarchy set.

By the transmission unit, a container including the predetermined number of video streams in a predetermined format is transmitted. For example, the container may be a transport stream (MPEG-2 TS) adopted by the digital broadcasting standards. Moreover, for example, the container may be a container in a format such as MP4 used for delivery on the Internet.

By the identification information insertion unit, identification information is inserted in a layer of the container. This identification information is identification information for identifying whether each of the predetermined number of video streams is a base stream having the coded image data of the picture in the lowest hierarchy set or an enhanced stream having the coded image data of the picture in a hierarchy set higher than the lowest hierarchy set.

For example, there are a plurality of enhanced streams, the identification information may be capable of identifying each of the enhanced streams. Moreover, for example, the container may be a transport stream and the identification information insertion unit may insert, as a stream type, the identification information in a video elementary stream loop arranged corresponding to the predetermined number of video streams under a program map table.

As described above, in the present technology, the indentification information for identifying whether each of the predetermined numbe of video streams is the base stream or the enhanced stream is inserted in the layer of the container. Therefore, on the receiver side, it is possible to select the base stream only and to easily and selectively decode the coded image data of the picture in a lower hierarchy set, for example, by using the identification information.

In addition, another concept of the present technology is a transmission apparatus including an image coding unit configured to classify image data of each picture constituting moving image data into a plurality of hierarchies, to code the image data of the picture in each of the classified hierarchies, to divide the plurality of hierarchies into a predetermined number of hierarchy sets, and to generate a predetermined number of video streams having the coded image data of the picture in each of the divided hierarchy sets, a transmission unit configured to transmit a contenner including the generated predetermined number of video streams in a predetermined format, and a configuration information insertion unit configured to insert, in a layer of the container, configuration information of the video stream corresponding to each of the predetermined numbe of video streams included in the container.

In the present technology, by the image coding unit, the image data of each pictuture constituting moving image data is coded, and a predetermined number of video streams are generated. In this case, the coded image data of each picture constituting moving image data is classified into a plurality of hierarchies and coded. Then, the plurality of hierarchies are divided into a predetermined number of hierarchy sets, and a predetermined number of video streams, each of which has the coded image data of the picture in the divided hierarchy set, are generated. Then, by the transmission unit, a container including the predetermined number of video streams in a predetermined format is transmitted.

By the configuration information insertion unit, configuration information of the video stream is inserted in a layer of the container corresponding to each of the predetermined number of video streams included in the container. For example, the container may be a transport stream, and the configuration information insertion unit may insert, as a descriptor, the configuration information in a video elementary stream loop arranged corresponding to each of the predetermined number of video streams under a program map table.

For example, the configuration information may include information representing a service group to which the video stream belongs. Moreover, for example, the configuration information may include information representing a dependence relationship between streams starting from the base stream having the coded image data of the picture in the lowest hierarchy set. Moreover, for example, the configuration information may include information representing the number of hierarchies of the plurality of hierarchies classified by the image coding unit.

As described above, in the present technology, the configuration information of the video stream is inserted in the layer of the container corresponding to each of the predetermined number of video streams included in the container. Therefore, for example, on the receiver side, it is possible to easily know which group the video stream included in the container belongs to, what stream-dependent relationship is there, what is the number of hierarchies in the hierarchical coding, and the like.

In addition, another concept of the present technology is a reception apparatus including a reception unit configured to receive a predetermined number of video streams having coded image data of a picture in a hierarchy set of a predetermined number of hierarchy sets, the coded image data being obtained by classifying image data of pictures constituting moving image data into a plurality of hierarchies and coding the image data, the plurality of hierarchies being divided into the predetermined number of hierarchy sets, and a processing unit configured to process the received predetermined number of video streams, in which at least a video stream of the predetermined number of video streams, which has coded image data of a picture in the lowest hierarchy set, is coded so that decoding interval for each picture is a regular interval.

In the present technology, by the receiver, the image data of each picture constituting moving image data is classified into a plurality of hierarchies and coded, and a predetermined number of video streams, each of which has the coded image data of the picture in a hierarchy set obtained by dividing the plurality of hierarchies into a predetermined number of hierarchy sets, are received. Then, by the processing unit, the received predetermined number of video streams are processed.

In this case, at least the video stream of the predetermined number of video streams, which has the coded image data of the picture in the lowest hierarchy set, is coded so that a decoding interval of each picture is a regular interval. Therefore, for example, with the decoding capability to process the coded image data of the pictures in the plurality of hierarchies of the lowest hierarchy set, it is possible to continuously and effortlessly perform decoding processing on the coded image data of each picture.

It should be noted that in the present technology, for example, the predetermined number of video streams may be coded so that a decoding timing for the coded image data of the picture in a hierarchy set higher than the lowest hierarchy set is an average timing of decoding timings for the coded image data of the pictures in all hierarchy sets lower than the hierarchy set. Accordingly, for example, with the decoding capability to decode the coded image data of the picture not only in the lowest hierarchy set but also in a hierarchy set higher than that, it is possible to smoothly and sequentially perform decoding processing on each picture.

In addition, another concept of the present technology is a reception apparatus including a reception unit configured to receive a predetermined number of video streams having coded image data of a picture in a hierarchy set of a predetermined number of hierarchy sets, the coded image data being obtained by classifying image data of pictures constituting moving image data into a plurality of hierarchies and coding the image data, the plurality of hierarchies being divided into the predetermined number of hierarchy sets, and an image decoding unit configured to selectively take coded image data of a picture in a hierarchy that is equal to or lower than a predetermined hierarchy depending on a decoding capability in a buffer from the predetermined number of video streams included in the received container, to decode the coded image data of the picture taken in the buffer, and to acquire image data of the picture in the hierarchy that is equal to or lower than the predetermined hierarchy, in which at least a video stream of the predetermined number of video streams, which has coded image data of a picture in the lowest hierarchy set, is coded so that decoding interval for each picture is a regular interval.

In the present technology, by the receiver, a container in a predetermined format is received. This container includes a predetermined number of video streams having the coded image data of picture in one of more hierarchies, which is obtained by classifying the image data of each picture constituting moving image data into a plurality of hierarchies, coding it, and dividing the plurality of hierarchies into a predetermined number of hierarchy sets.

By the image decoding unit, coded image data of a picture in a hierarchy that is equal to or lower than a predetermined hierarchy set depending on the decoding capability is selectively taken in a buffer from the predetermined number of video streams included in the received container, and the coded image data of each picture taken in the buffer is decoded to acquire image data of a picture in a hierarchy that is equal to or lower than the predetermined hierarchy. For example, in the case where the coded image data of the picture in the predetermined hierarchy set is included in a plurality of video streams, the image decoding unit may decode the coded image data of each picture as one stream based on decoding timing information.

In this case, at least the video stream of the predetermined number of video streams, which has the coded image data of the picture in the lowest hierarchy set, is coded so that a decoding interval of each picture is a regular interval. Therefore, for example, with the decoding capability to process the coded image data of the pictures in the plurality of hierarchies of the lowest hierarchy set, it is possible to continuously and effortlessly perform decoding processing on the coded image data of each picture.

It should be noted that in the present technology, for example, identification information for identifying whether each of the predetermined number of video streams is the base stream including the coded image data of the picture in the lowest hierarchy set or the enhanced stream including the coded image data of the picture in a hierarchy set higher than the lowest hierarchy set may be inserted in a layer of the container, and the image decoding unit may take the coded image data in a predetermined hierarchy set depending on the decoding capability in a buffer from the predetermined number of video streams including the base stream based on the identification information and decode it. In this case, it is possible to select the base stream only and to easily and selectively decode the coded image data of the picture in a lower hierarchy set, for example, by using the identification information.

In addition, in the present technology, for example, a post processing unit configured to match a frame rate of the image data of each picture acquired in the image decoding unit with a display capability may be further provided. In this case, even in the case where the decoding capability is low, it is possible to acquire the image data at a frame rate that matches a high display capability.

Effects of the Invention

According to the present technology, it is possible to perform favorable decoding processing on the receiver side. Effects described herein are not necessarily limited, and may be any one of the effects described herein.

BRIEF DESCRIPTION OF DRAWINGS

FIG. 4 A diagram showing a structural example of an NAL unit header and the content of main parameters in the structural example.

FIG. 5 A diagram for explaining the configuration of the coded image data of each picture in HEVC.

FIG. 6 A diagram showing an example of encoding, decoding, a display order, and delay during the hierarchical coding.

FIG. 9 A diagram showing an example of the coding timing (decoding timing) for each picture in the case where two video streams of a base stream and an enhanced stream are generated.

FIG. 17 A diagram showing a structural example of HEVC descriptor (HEVC_descriptor).

FIG. 18 A diagram showing a structural example of a multistream descriptor (multistream descriptor).

FIG. 19 A diagram showing the content of main information in the structural example of the multistream descriptor (multistream descriptor).

[FIG. 20] A diagram showing an example of "Stream_type," "Group_id", "max/min layer", "max_layer_in_group", and "Stream_dependency_ordering" in the case where a transport stream TS includes, for example, a video stream group of services 1 and 2.

MODES FOR PERFORMING THE INVENTION

Hereinafter, an embodiment for performing the present invention (hereinafter, referred to as embodiment) will be described. It should be noted that a description will be made in the following order.

1. Embodiment
2. Modified Example

1. EMBODIMENT

[Transmission/Reception System]

Figure 1:
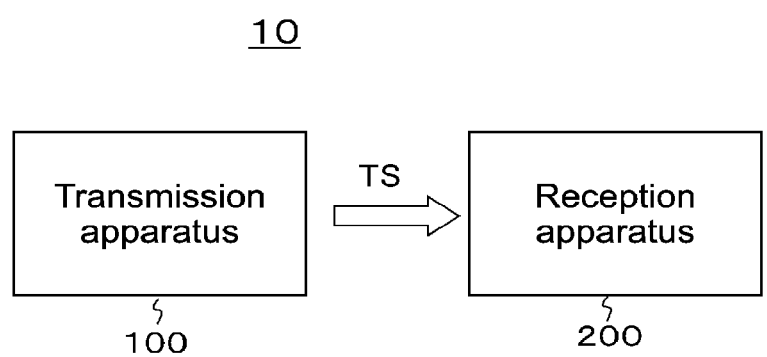
FIG. 1 A block diagram showing a configuration example of a transmission/reception system according to an embodiment.

FIG. 1 shows a configuration example of a transmission/reception system 10 according to an embodiment. The transmission/reception system 10 includes a transmission apparatus 100 and a reception apparatus 200.

the transmission apparatus 100 causes a transport stream TS serving as a container to be carried on a broadcast wave for transmission. The transport stream TS includes a predetermined number of video streams, each of which has image data of a picture in a hierarchy set obtained by classifying image data of each picture constituting moving image data into a plurality of hierarchies, coding it, and dividing the plurality of hierarchies into a predetermined number of hierarchy sets. In this case, coding such as H.264/AVC and H.265/HEVC is performed so that the referred picture belongs to a self-hierarchy and/or a hierarchy lower than the self-hierarchy.

In this embodiment, in the case where the plurality of hierarchies are divided into a predetermined number of hierarchy sets, the division is made so that the lowest hierarchy set includes a plurality of hierarchies and a hierarchy set higher than the lowest hierarchy set includes one hierarchy. Such division allows the receiver to select only a video stream having the coded image data of the picture in the lowest hierarchy set, to take it in a buffer, and to perform decoding processing on it, if the receiver has the decoding capability to process coded image data of pictures of the plurality of hierarchies included in the lowest hierarchy set, for example.

To the coded image data of the picture in each hierarchy, hierarchy identification information for identifying the belonging hierarchy is added for each picture. In this embodiment, at the header portion of a NAL unit (nal_unit) of each picture, the hierarchy identification information ("nuh_temporal_id_plus1" representing temporal_id) is arranged. By adding the hierarchy identification information as described above, the receiver can identify the hierarchy of each picture in the layer of the NAL unit, and selectively take out the coded image data in a hierarchy that equals to or lower than a predetermined hierarchy to perform decoding processing on it.

In this embodiment, at least the video stream having the coded image data of the picture of the lowest hierarchy set out of the predetermined number of video streams is coded so that the decoding interval between the pictures is a regular interval. This coding allows the receiver to continuously and effortlessly perform decoding processing on the coded image data of each picture if the receiver has the decoding capability to process coded image data of pictures of the plurality of hierarchies included in the lowest hierarchy set.

In this embodiment, coding is performs so that the decoding timing of the coded image data of the picture in a hierarchy set higher than the lowest hierarchy set is set to an average timing of coding timings of the pictures of all the hierarchy sets lower than this hierarchy set. This coding allows the receiver to successively and smoothly perform decoding processing on each picture if the receiver has capabilities to decode the coded image data of the picture not only in the lowest hierarchy set but also in a hierarchy set higher than the lowest hierarchy set.

In this embodiment, in the layer of the transport stream TS, identification information for identifying whether each of the predetermined number of video streams is a base stream having the coded image data of the picture in the lowest hierarchy set or an enhanced stream having the coded image data of the picture in a hierarchy set higher than the lowest hierarchy set is inserted. This identification information is inserted as a stream type in a video elementary stream loop arranged corresponding to each of the predetermined number of video streams under a program map table. The identification information allows the receiver to easily select only the base stream to selectively decode the coded image data of the picture in a lower hierarchy set.

In this embodiment, in the layer of the transport stream TS, configuration information of the video stream corresponding to each of the predetermined number of video streams included therein is inserted. This configuration information is inserted as a descriptor in the video elementary stream loop arranged corresponding to the predetermined number of video streams under the program map table. This configuration information allows the receiver to easily know which group the video stream included in the container belongs to, what stream-dependent relationship is there, what is the number of hierarchies in the hierarchical coding, and the like.

The reception apparatus 200 receives the above-mentioned transport stream TS that is carried on a broadcast wave and is transmitted from the transmission apparatus 100. The reception apparatus 200 selectively takes the coded image data of the picture in a hierarchy that is equal to or lower than the predetermined hierarchy, which is selected depending on the decoding capability from the predetermined number of video streams included in the transport stream TS, in a buffer, decodes it, acquires the image data of each picture, and performs image reproduction.

As described above, the layer of the transport stream TS includes the identification information for identifying whether the predetermined number of video streams is the base stream or the enhanced stream. Based on the identification information, the coded image data in the predetermined hierarchy set depending on the decoding capability is taken, from the predetermined number of video streams including the base stream, in the buffer for processing.

In addition, the reception apparatus 200 performs post processing in which the frame rate of the image data of each picture, which is obtained by the above-mentioned decoding, is matched with the display capability. According to this post processing, it is possible to acquire the image data at the frame rate that matches a high display capability even if the decoding capability is low, for example.

"Configuration of Transmission Apparatus"

Figure 2:
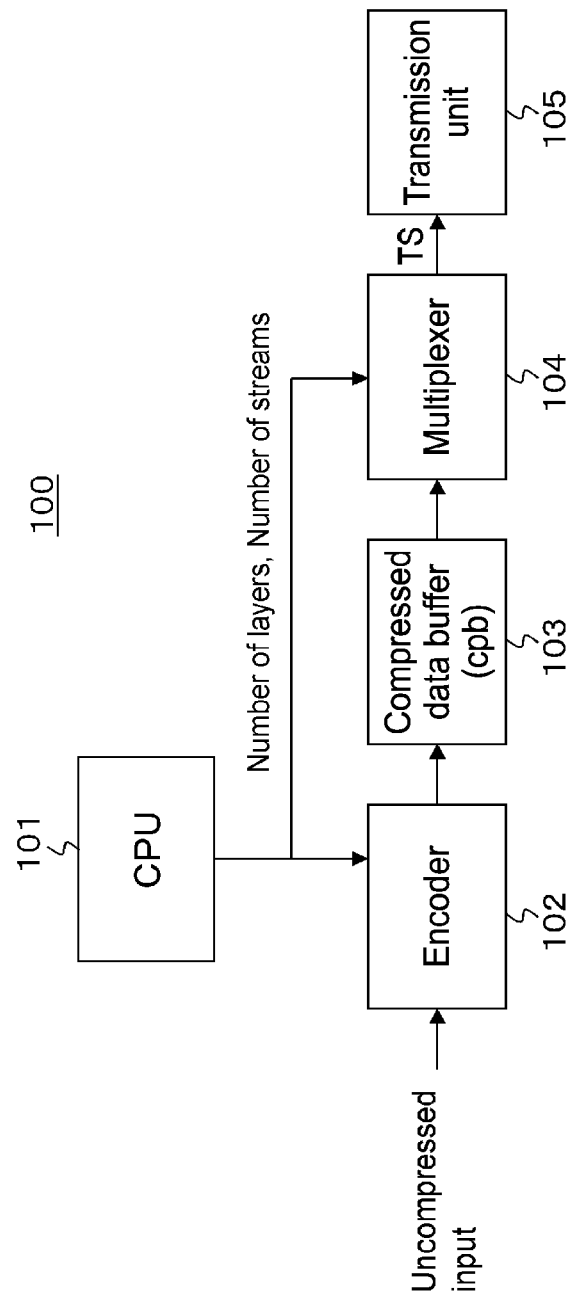
FIG. 2 A block diagram showing a configuration example of a transmission apparatus.

FIG. 2 shows a configuration example of the transmission apparatus 100. This transmission apparatus 100 includes a CPU (Central Processing Unit) 101, an encoder 102, a compressed data buffer (cpb: coded picture buffer) 103, a multiplexer 104, and a transmission unit 105. The CPU 101 is a controller, and controls the operation of the respective units of the transmission apparatus 100.

The encoder 102 inputs non-compressed moving image data, and hierarchically codes it. The encoder 102 classifies the image data of each picture constituting the moving image data into a plurality of hierarchies. Then, the encoder 102 codes the image data of the picture in each of the classified hierarchies to generate a video stream having the coded image data of the picture in each hierarchy. The encoder 102 performs coding such as H.264/AVC and H.265/HEVC. At this time, the encoder 102 performs coding so that the picture to be referred to (referred picture) belongs to the self-hierarchy and/or a hierarchy lower than the self-hierarchy.

Figure 3:
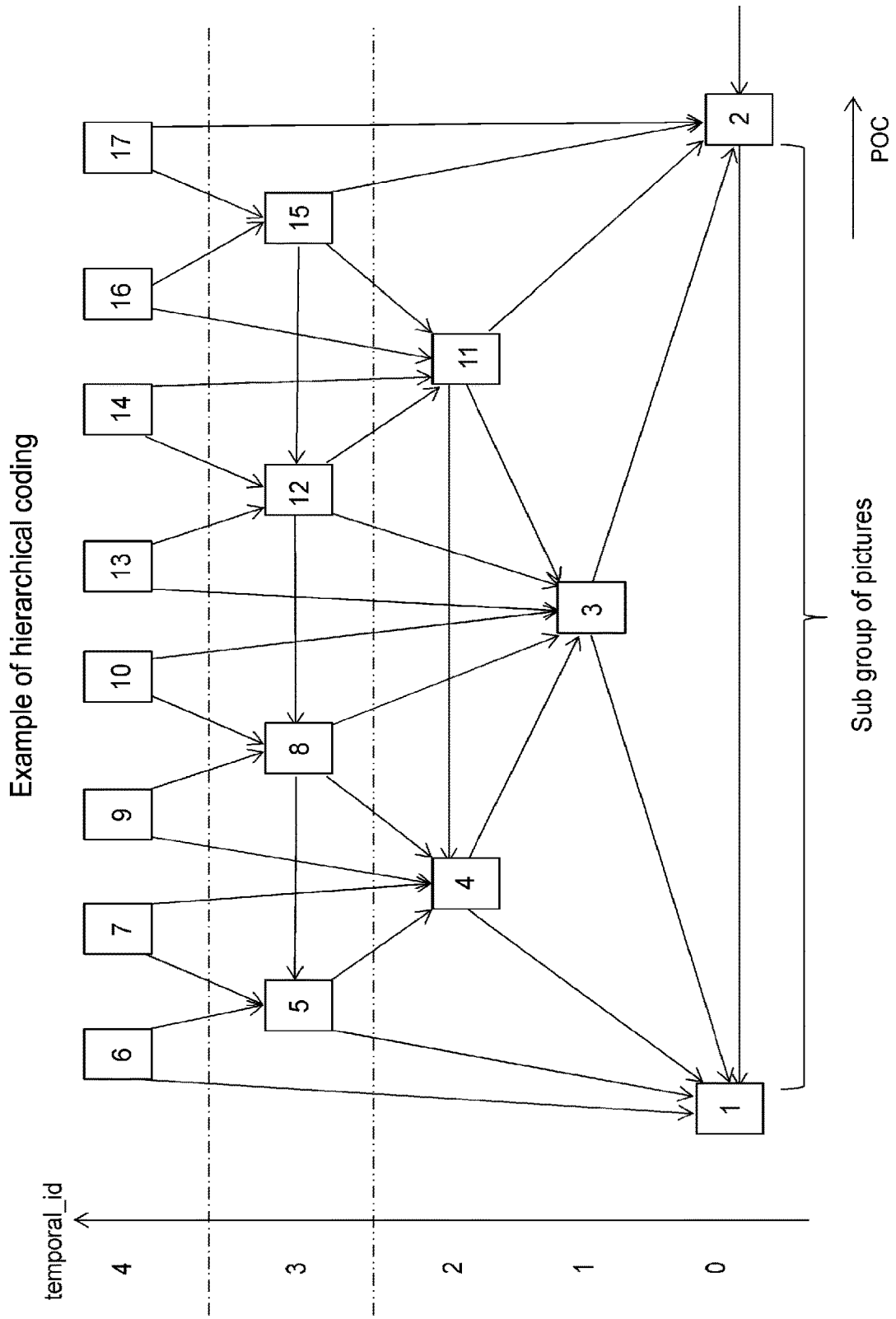
FIG. 3 A diagram showing an example of hierarchical coding performed in an encoder.

FIG. 3 shows an example of hierarchical coding performed in the encoder 102. This is an example in which the image data is divided into 5 hierarchies from 0 to 4, and coding is performed on the image data of the picture in each hierarchy.

The vertical axis represents the hierarchy. As temporal_id (hierarchy identification information) arranged at the header portion of the NAL unit (nal_unit) constituting the coded image data of the picture in the hierarchies from 0 to 4, the numbers from 0 to 4 are set, respectively. On the other hand, the horizontal axis represents the display order (poc: picture order of composition). The left side is earlier display time, and the right side is later display time.

FIG. 4(a) shows a structural example (Syntax) of a NAL unit header, and FIG. 4(b) shows the content (Semantics) of main parameters in the structural example. In the 1 bit field of "Forbidden_zero_bit," 0 is essential. The 6 bit field of "Nal_unit_type" represents the NAL unit type. In the 6 bit field of "Nuh_layer_id," 0 is assumed. The 3 bit field of "Nuh_temporal_id_plus1" represents the temporal_id and takes values (from 1 to 7) obtained by adding 1 thereto.

Now, return to FIG. 3. Each of the rectangular frames represents a picture, and the number represents the order of pictures being coded, i.e., encoding order (decoding order on the receiver side). For example, a sub-picture group (Sub group of pictures) includes 16 pictures from "2" to "17," and the "2" is the top picture of the sub-picture group. The "1" is a picture of a previous sub-picture group. Some sub-picture groups are collected to form GOP (Group of Pictures).

The coded image data of the top picture of the GOP includes the NAL unit of AUD, VPS, SPS, PPS, PSEI, SLICE, SSEI, and EOS, as shown in FIG. 5. On the other hand, the picture other than the top picture of the GOP includes the NAL unit of AUD, PPS, PSEI, SLICE, SSEI, and EOS. The VPS and SPS can be transmitted once for each sequence (GOP), and the PPS can be transmitted for each picture.

Now, return to FIG. 3. The arrows shown by solid lines represent the picture-reference relationship in coding. For example, the picture of "2" is a P picture, and is coded with reference to the picture of "1." Moreover, the picture of "3" is a B picture, and is coded with reference to the pictures of "1" and "3." Similarly, other pictures are coded with reference to a near picture in the display order. It should be noted that the picture in the hierarchy 4 is not referred to from other pictures.

The encoder 102 divides the plurality of hierarchies into a predetermined number of hierarchy sets to generate a predetermined number of video streams having the coded image data of the picture in the hierarchy set. For example, the encoder 102 performs the division so that the lowest hierarchy set includes a plurality of hierarchies and a hierarchy set higher than the lowest hierarchy set includes one hierarchy.

For example, in the example of the hierarchical coding shown in FIG. 3, the encoder 102 divides the plurality of hierarchies into 2 hierarchy sets including the hierarchies from 0 to 3 as the lowest hierarchy set and the hierarchy 4 as a hierarchy set higher than the lowest hierarchy set, as shown by the alternate long and short dash line. In this case, the encoder 102 generates two video streams (coded streams) having the coded image data of the picture in the hierarchy set.

Moreover, for example, in the example of the hierarchical coding shown in FIG. 3, the encoder 102 divides the plurality of hierarchies into 3 hierarchy sets including the hierarchies from 0 to 2 as the lowest hierarchy set, the hierarchy 3 as a hierarchy set higher than the lowest hierarchy set, and the hierarchy 4 as a hierarchy higher than the hierarchy, as shown by the alternate long and short dash line and the long dashed double-short dashed line. In this case, the encoder 102 generates three video streams (coded video streams) having the coded image data of the picture of the hierarchy set.

In this case, the video stream having the coded image data of the picture in the lowest hierarchy set is the base stream, and the stream type is "0x24." Moreover, the video stream including the coded image data of the picture in a hierarchy set higher than the lowest hierarchy set is the enhanced stream, and the stream type is newly defined as "0x25."

It should be noted that in the case where there are a plurality of enhanced streams, it is possible to newly define the stream type so that the stream types of all of the enhanced streams are not "0x25" but each enhance stream can be identified. For example, in the case where there are two enhanced streams, the stream type of a first enhanced stream is "0x25," and the stream type of a second enhanced stream is "0x26."

This stream type constitutes identification information for identifying whether each of the predetermined number of video streams is the base stream or the enhanced stream. This stream type is inserted in the layer of the transport stream TS. Specifically, this stream type is inserted in the video elementary stream loop arranged corresponding to each of the predetermined number of video streams under the program map table (PMT: Program Map Table).

FIG. 6 shows an example of encoding, decoding, a display order, and delay during the hierarchical coding. This example corresponds to the above-mentioned example of the hierarchical coding shown in FIG. 3. This example shows the case where all of the hierarchies (all layers) are hierarchically coded with a full time resolution. FIG. 6(a) represents the encoder input. As shown in FIG. 6(b), with the delay in the amount corresponding to 16 pictures, each picture is encoded in the encoding order, and thus, a coded stream is acquired. Moreover, FIG. 6(b) represents the decoder input, and each picture is decoded in the decoding order. Then, as shown in FIG. 6(c), with the delay in the amount corresponding to 4 pictures, the image data of each picture is acquired in the display order.

Figure 7:
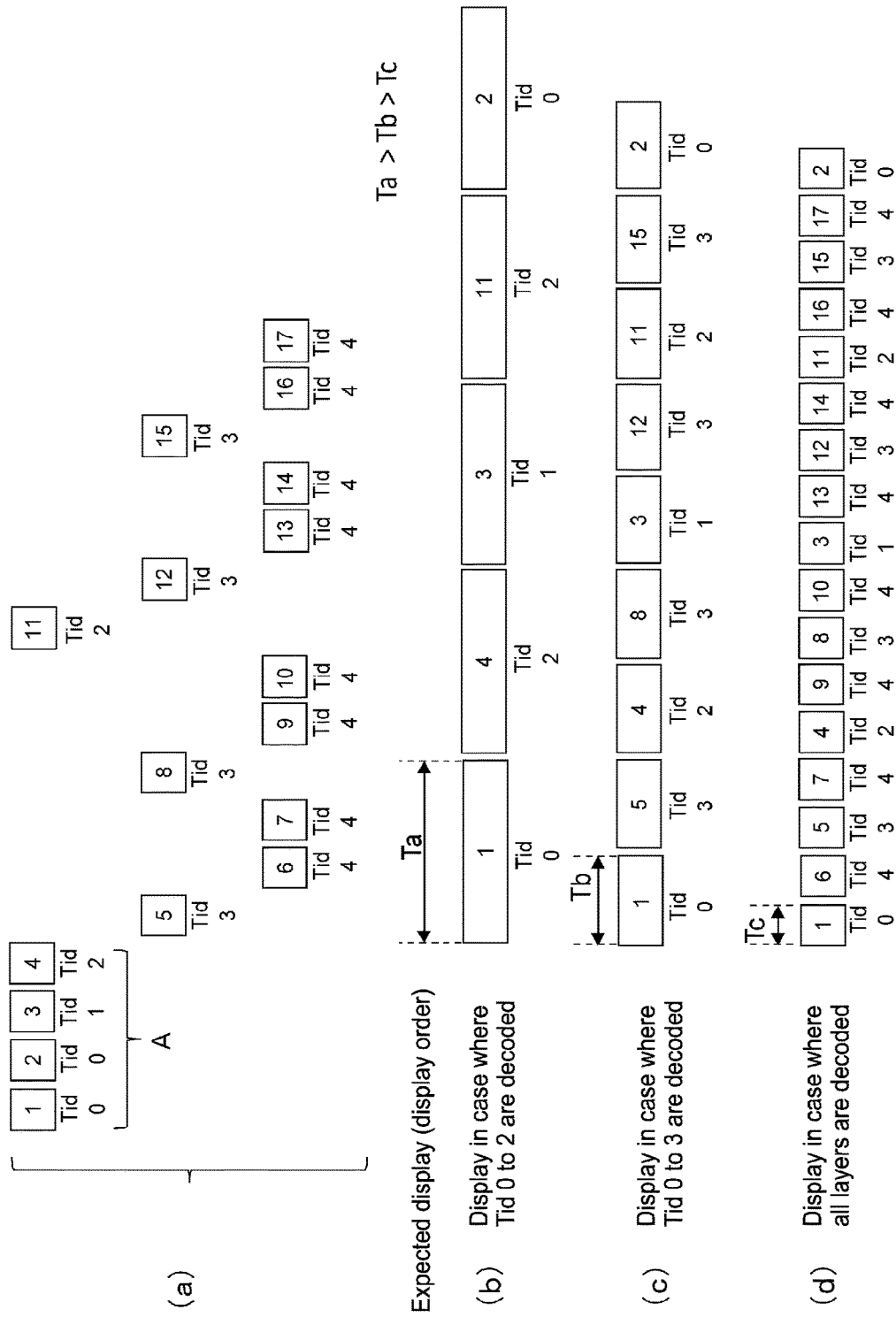
FIG. 7 A diagram showing a coded stream in the hierarchical coding and the expected display (display order) in a designated hierarchy.

FIG. 7(a) shows the coded stream that is similar to that shown in FIG. 6(b) described above with three divided stages of hierarchies, i.e., the hierarchies 0 to 2, the hierarchy 3, and the hierarchy 4. Here, the "Tid" represents the temporal_id. FIG. 7(b) represents the expected display (display order) in the case where each picture in the hierarchies of 0 to 2, i.e., the partial hierarchies having Tid of 0 to 2, is selectively decoded. Moreover, FIG. 7(c) represents the expected display (display order) in the case where each picture in the hierarchies of 0 to 3, i.e., the partial hierarchies having Tid of 0 to 3, is selectively decoded. Furthermore, FIG. 7(d) represents the expected display (display order) in the case where each picture in the hierarchies of 0 to 4, i.e., all of the hierarchies having Tid of 0 to 4, is selectively decoded.

In the case where decoding processing is performed on the coded stream shown in FIG. 7(a) depending on the decoding capability, the decoding capability having a time resolution at the full rate is needed. However, in the case where decoding with Tid of 0 to 2 is performed, a decoder having a decoding capability of ¼ of the coded full time resolution should be capable of performing the decoding. Moreover, in the case where decoding with Tid of 0 to 3 is performed, a decoder having a decoding capability of ½ of the coded full time resolution should be capable of performing the decoding.

However, if pictures in a low hierarchy referred to in the hierarchical coding are sequentially coded at a timing with a full time resolution, it outstrips the capability of the decoder that performs the partial decoding. The period of time shown by A in FIG. 7(a) corresponds to that. Because the decoder that decodes the partial hierarchies having Tid of 0 to 2 or Tid of 0 to 3 performs decoding and display with a capability of ¼ or ½ of the time axis as shown in the example of display, it cannot sequentially decode the pictures with the coded full time resolution during the period of time A.

The Ta represents the time required for the decoding processing for each picture in the decoder that decodes Tid of 0 to 2. The Tb represents the time required for the decoding processing for each picture in the decoder that decodes Tid of 0 to 3. The Tc represents the time required for the decoding processing for each picture in the decoder that decodes Tid of 0 to 4 (all hierarchies). In the relationship between these time periods, the following equation is established: Ta>Tb>Tc.

In this embodiment, the encoder 102 performs decoding so that a decoding interval of at least the coded image data of the picture in the lowest hierarchy set is a regular interval. FIG. 8(a) shows the case where each picture is coded at a timing of 120 Hz and the full time resolution in the example of the hierarchical coding shown in FIG. 3, and is divided into two hierarchy sets in which the hierarchies 0 to 3 are the lowest hierarchy set constituting the base stream (B stream) and the hierarchy 4 is a hierarchy set higher than that constituting the enhanced stream (E stream).

In this case, the time resolution of the picture in the lowest hierarchy set is 60 fps, and there exist pictures sequentially coded at timing of 120 Hz. The decoder having a decoding capability of 60 fps cannot sequentially and reliably perform the decoding processing. Therefore, as shown in FIG. 8(b), the coding timing for the picture in the lowest hierarchy set constituting the base stream is adjusted to be 60 Hz, and the coding is performed so that the decoding interval of the coded image data of the picture in the lowest hierarchy set is a regular interval. Accordingly, the decoder having a decoding capability of 60 fps can sequentially and reliably perform decoding processing on the coded image data of the picture in the lowest hierarchy set constituting the base stream.

Moreover, as shown in FIG. 8(b), the decoding is performed so that the coding timing for the picture in the hierarchy set constituting the enhanced stream (E stream) and therefore, the decoding timing of the coded image data of the picture are average timing of the decoding timings of the coded image data of the picture in the lowest hierarchy set constituting the base stream (B stream). Accordingly, in the case where the receiver has the capability to decode the coded image data of the picture in the hierarchy set constituting not only the base stream but also the enhanced stream, it is possible to successively and smoothly perform decoding processing on each picture.

FIG. 9 shows an example of coding timing (decoding timing) of each picture in the case where two video streams of the base stream (B stream) and the enhanced stream (E stream) are generated in the example of the hierarchical coding shown in FIG. 3. This is an example in which the decoding delay of the enhanced stream is decreased against the base stream. The decoding delay in this case corresponds to 8 pictures at the coding interval of the full time resolution (½ of the coding interval of the base stream).

In this example, the coding timing of the picture of the base stream (B stream) is an even-numbered timing, and the coding timing of the enhanced stream (E stream) is an odd-numbered timing. Then, in this example, the enhanced stream (E stream) is coded immediately after the coding order of the highest layer of the base stream (B stream). Specifically, the picture of "9" of the enhanced stream (E stream) is coded right after the picture of "8" of the base stream (B stream).

Figure 10:
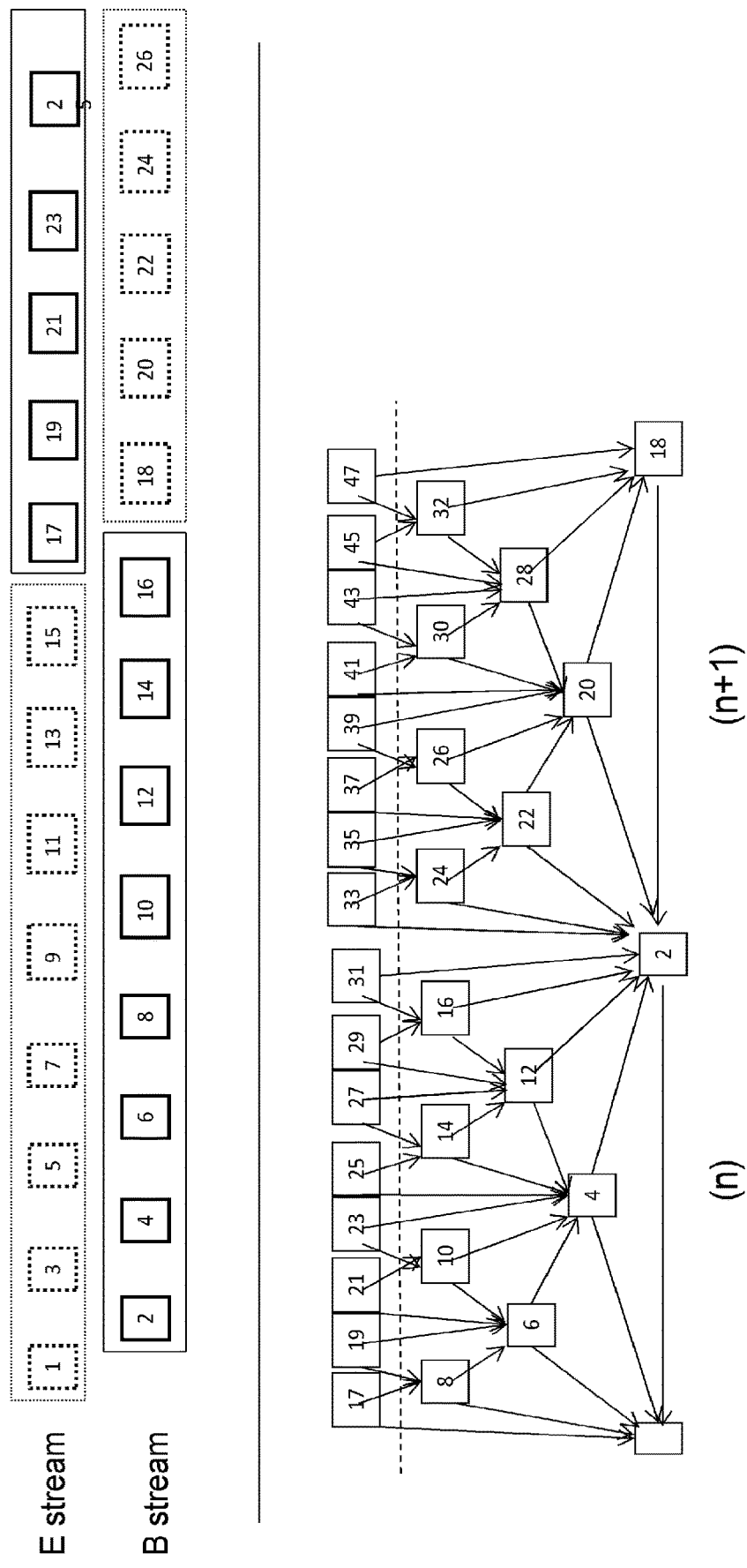
FIG. 10 A diagram showing another example of the coding timing (decoding timing) for each picture in the case where two video streams of a base stream and an enhanced stream are generated.

FIG. 10 shows another example of coding timing (decoding timing) for each picture in the case where two video streams of the base stream (B stream) and the enhanced stream (E stream) are generated in the example of the hierarchical coding shown in FIG. 3. This is an example in which the decoding delay of the enhanced stream is increased against the base stream. The decoding delay in this case corresponds to 16 pictures at the coding interval of the full time resolution (½ of the coding interval of the base stream). In the case where the decoding delay is increased as described above, it needs a reference memory having a large capacity in the non-compressed data buffer (dpb: decoded picture buffer).

In this example, the coding timing for the picture of the base stream (B stream) is an even-numbered timing, and the coding timing of the enhanced stream (E stream) is an odd-numbered timing. Then, in this example, the enhanced stream (E stream) is coded after the coding of the highest layer of the base stream (B stream) is finished. Specifically, the picture of "17" of the enhanced stream (E stream) is coded right after the picture of "16" of the base stream (B stream).

As described above, it is possible to decrease or increase the delay amount of the enhanced stream against the base stream. This delay amount can be adjusted by limiting the destination picture with coding efficiency priority or achievement of low delay.

FIG. 11(a) shows the case where each picture is coded at the timing of 120 Hz and the full time resolution in the example of the hierarchical coding shown in FIG. 3, and is divided into three hierarchy sets in which the hierarchies 0 to 2 are the lowest hierarchy set constituting the base stream (B stream), the hierarchy 3 is a hierarchy set higher than the hierarchy set constituting the enhances stream (E stream 1), and the hierarchy 4 is a hierarchy set higher than the hierarchy set constituting the enhanced stream (E stream 2).

In this case, the time resolution of the picture in the lowest hierarchy set is 30 fps, and there are pictures sequentially coded at timing of 120 Hz. The decoder having a decoding capability of 30 fps cannot sequentially and reliably perform the decoding processing. Therefore, as shown in FIG. 11(b), the coding timing for the picture in the lowest hierarchy set constituting the base stream is adjusted to be 30 Hz, and the coding is performed so that the decoding interval of the coded image data of the picture in the lowest hierarchy set is a regular interval. Accordingly, the decoder having a decoding capability of 30 fps can sequentially and reliably perform decoding processing on the coded image data of the picture in the lowest hierarchy set constituting the base stream.

Moreover, as shown in FIG. 11(b), the decoding is performed so that the coding timing for the picture in the hierarchy set constituting the enhanced stream (E stream 1) and therefore, the decoding timing of the coded image data of the picture are average timing of the decoding timings for the coded image data of the pictures in the lowest hierarchy set constituting the base stream (B stream). Furthermore, as shown in FIG. 11(b), the decoding is performed so that the coding timing for the picture in the hierarchy set constituting the enhanced stream (E stream 2) and therefore, the decoding timing of the coded image data of the picture are average timing of the decoding timings for the coded image data of the pictures in the hierarchy set constituting the base stream (B stream) and the enhanced stream (E stream 1). Accordingly, in the case where the receiver has the capability to decode the coded image data of the picture in the hierarchy set constituting not only the base stream but also the two enhanced streams, it is possible to successively and smoothly perform decoding processing on each picture.

Figure 12:
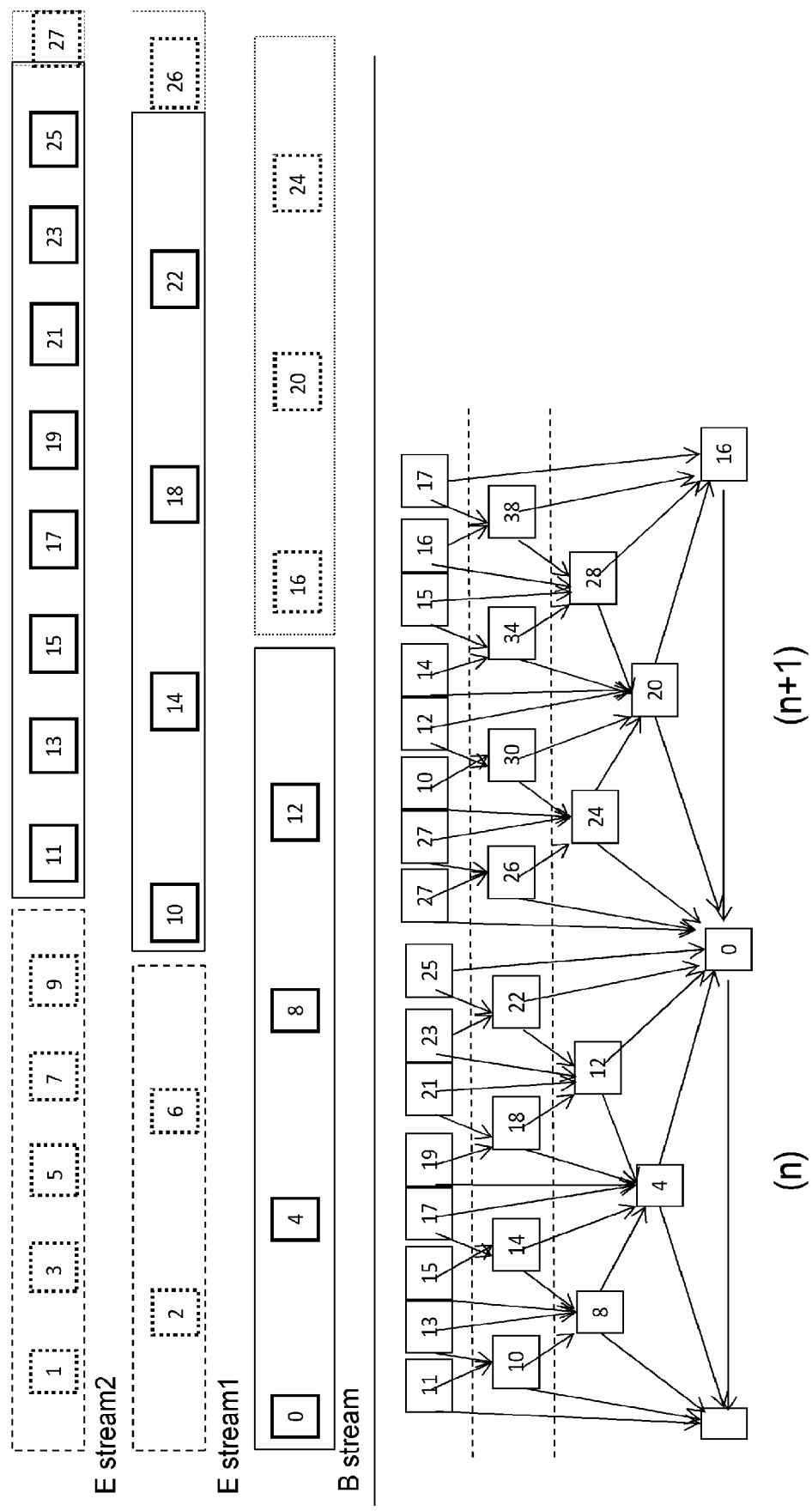
FIG. 12 A diagram showing an example of the coding timing (decoding timing) for each picture in the case where three video streams of a base stream and two enhanced streams are generated.

FIG. 12 shows an example of coding timing (decoding timing) for each picture in the case where three video streams of the base stream (B stream), the enhanced stream (E stream 1), and the enhanced stream (E stream 2) are generated in the example of the hierarchical coding shown in FIG. 3. This is an example in which the decoding delay of the enhanced stream is decreased against the base stream. The decoding delay in this case corresponds to 12 pictures at the coding interval of the full time resolution (¼ of the coding interval of the base stream).

In this example, the coding timing for the picture of the base stream (B stream) is a timing of multiples of four, and the coding timing of the enhanced stream (E stream 1) is an average timing of the coding timings for the pictures of the base stream (B stream) in multiples of four. Moreover, the coding timing of the enhanced stream (E stream 1) is an odd-numbered timing.

Then, in this example, the enhanced stream (E stream 1) is coded immediately after the coding order of the highest layer of the base stream (B stream). Specifically, the picture of "10" of the enhanced stream (E stream 1) is coded right after the picture of "8" of the base stream (B stream) is coded. Moreover, in this example, the enhanced stream (E stream 2) is coded immediately after the coding order of the enhanced stream (E stream 1). Specifically, the picture of "11" of the enhanced stream (E stream 2) is coded immediately after the picture of "10" of the enhanced stream (E stream 1).

Figure 13:
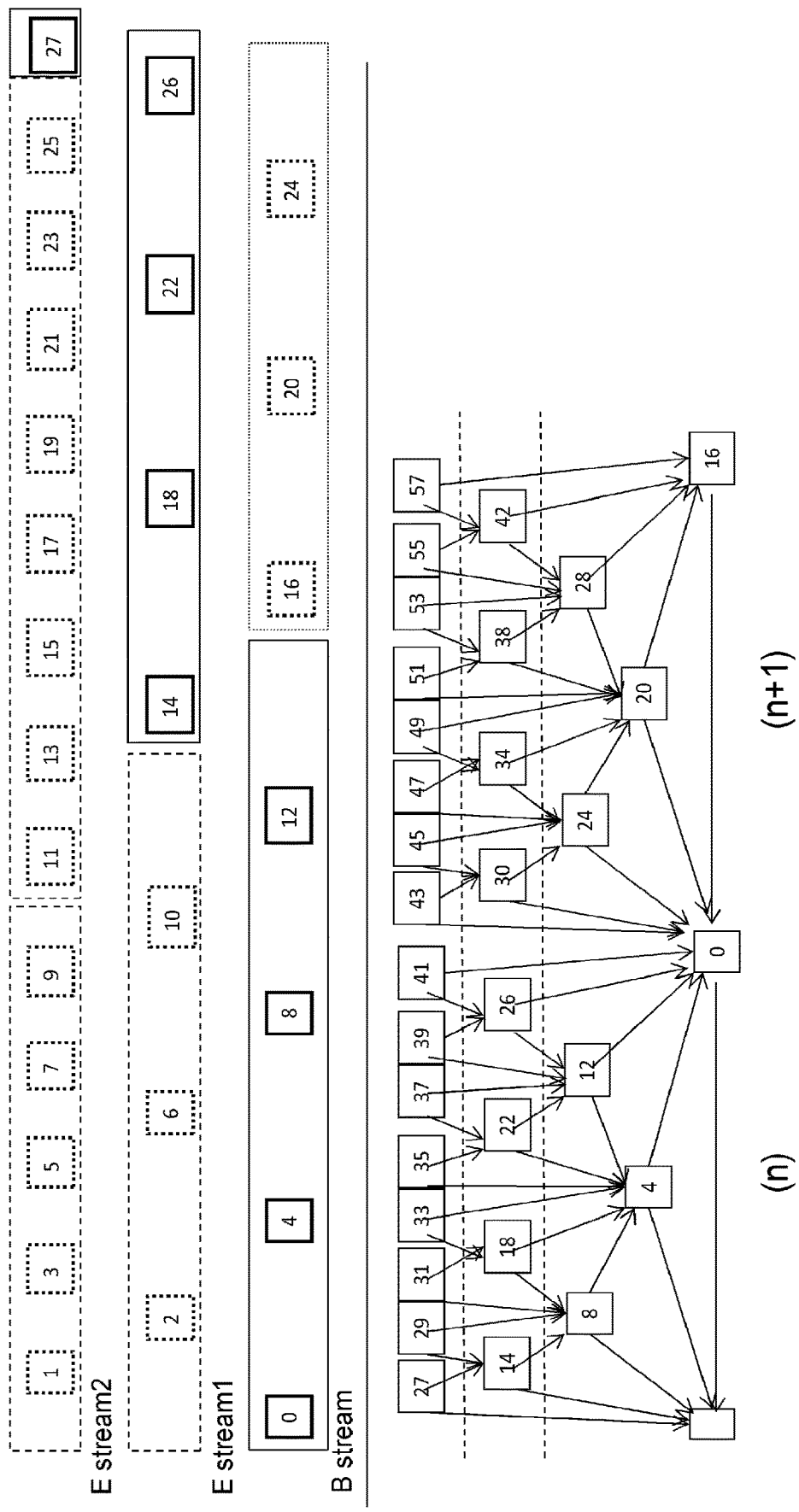
FIG. 13 A diagram showing another example of the coding timing (decoding timing) for each picture in the case where three video streams of a base stream and two enhanced streams are generated.

FIG. 13 shows another example of the coding timing (decoding timing) of each picture in the case where three video streams of the base stream (B stream), the enhanced stream (E stream 1), and the enhanced stream (E stream 2) are generated in the example of the hierarchical coding shown in FIG. 3. This is an example in which the decoding delay of the enhanced stream is increased against the base stream. The decoding delay in this case corresponds to 27 pictures at the coding interval of the full time resolution (¼ of the coding interval of the base stream). In the case where the decoding delay is increased as described above, it needs a reference memory having a large capacity in the non-compressed data buffer (dpb: decoded picture buffer).

In this example, the coding timing of the picture of the base stream (B stream) is a timing of multiples of four, and the coding timing of the enhanced stream (E stream 1) is an average timing of the coding timing of the picture of the base stream (B stream) in multiples of four. Moreover, the coding timing of the enhanced stream (E stream 1) is an odd-numbered timing.

Then, in this example, the enhanced stream (E stream 1) is coded after the highest layer of the base stream (B stream) is coded. Specifically, the picture of "14" of the enhanced stream (E stream 1) is coded right after the picture of "12" of the base stream (B stream). Moreover, in this example, the enhanced stream (E stream 2) is coded after the enhanced stream (E stream 1) is coded. Specifically, the picture of "27" of the enhanced stream (E stream 2) is coded right after the picture of "26" of the enhanced stream (E stream 1).

Figure 14:
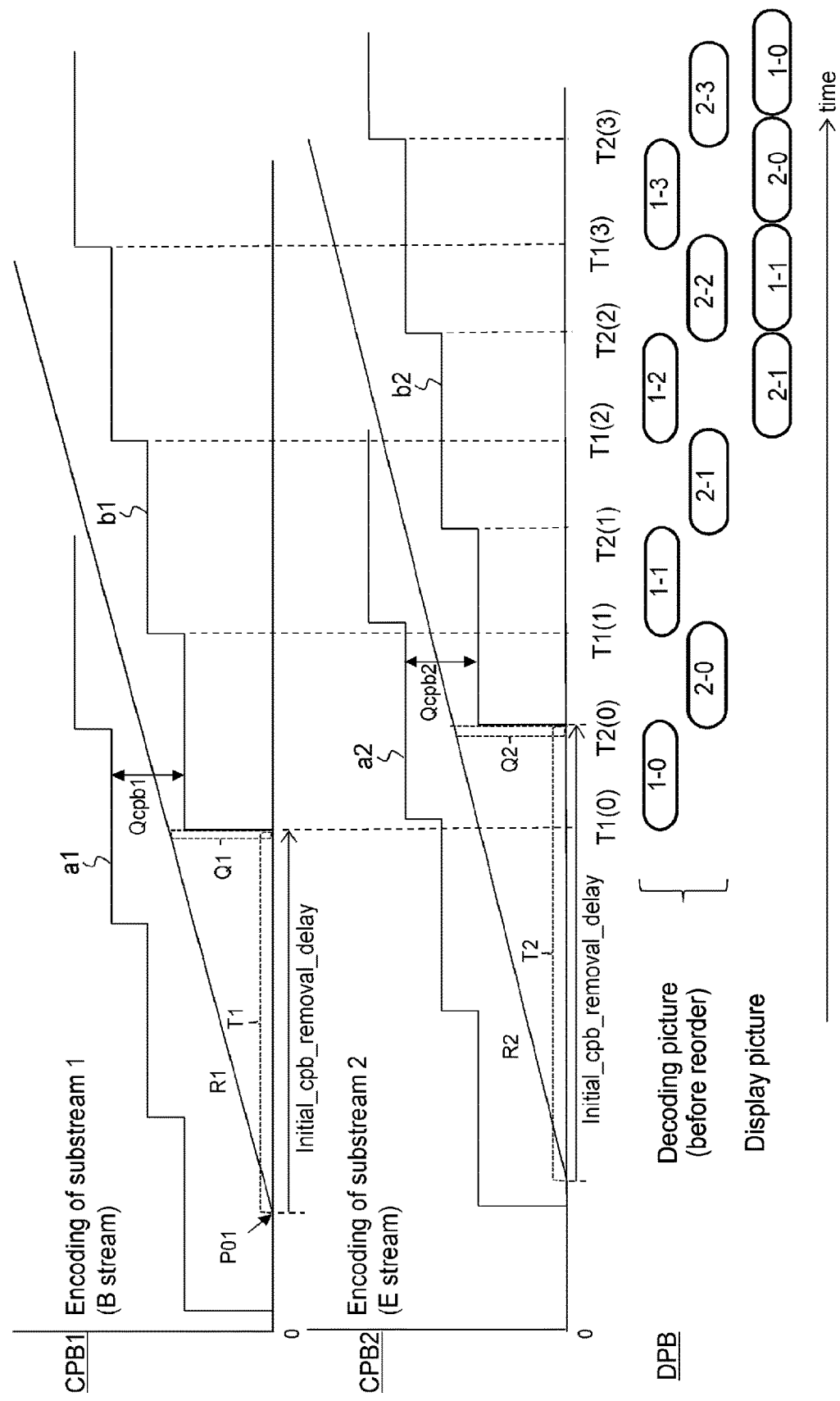
FIG. 14 A diagram showing an example of HRD (Hypothetical Reference Decoder) control of an encoder.

FIG. 14 shows an example of HRD (Hypothetical Reference Decoder) control of the encoder 102. This is an example in which two video streams of the base stream (B stream) and the enhanced stream (E stream) are generated. Here, a description will be made with the base stream as a substream 1 (Substream 1) and the enhanced stream as a substream 2 (Substream 2).

A solid line a1 having a step-like shape represents the shift of the data amount of the substream 1 generated by encoding (coding), and each step corresponds to the unit of one picture. The height of the step represents the data amount generated by the encoding.

A timing P01 represents the timing when the first byte of the coded image data of the first picture enters cpb1 (coded picture buffer 1: compressed data buffer). R1 represents the input bit rate to the cpb1 of the coded image data of the first picture. Here, if the amount of coded data input to the cpb1 at the time of T1 is Q1, the following equation is established: R1=Q1/T1. It should be noted that in the example shown in the figure, the case where the input bit rate to the cpb1 of the coded image data of another picture is also R1 is shown.

A solid line b1 having a step-like shape represents the shift of the data amount consumed by decoding in the cpb1, and each step corresponds to the unit of one picture. The height of the step represents the data amount consumed by the decoding. Qcpb1 represents the occupation amount of the cpd1. The encoding is performed so that this occupation amount does not exceed the size of cpb1 (memory capacity) at any timing.

Moreover, a solid line a2 having a step-like shape represents the shift of the data amount of the substream 2, which is generated by the encoding (coding), and each step corresponds to the unit of one picture. The height of the step represents the data amount generated by the encoding.

A timing P02 represents a timing when the first byte of the coded image data of the first picture enters cpb2 (coded picture buffer 2: compressed data buffer). R2 represents the input bit rate to the cpb2 of the coded image data of the first picture. Here, if the amount of coded data input to the cpb2 at the time of T2 is Q2, the following equation is established: R2=Q2/T2. It should be noted that in the example shown in the figure, the case where the input bit rate to the cpb2 of the coded image data of another picture is also R2 is shown.

A solid line b2 having a step-like shape represents the shift of the data amount consumed by decoding in the cpb2, and each step corresponds to the unit of one picture. The height of the step represents the data amount consumed by the decoding. Qcpb2 represents the occupation amount of the cpd2. The encoding is performed so that this occupation amount does not exceed the size of the cpb2 (memory capacity) at any timing.

In the example shown in the figure, decoding is performed for the substream 1 in the picture order of "1-0," "1-1," "1-2," "1-3," . . . , for the substream 2 in the picture order of "2-0," "2-1," "2-2," "2-3" . . . , as described above, the pictures of the substream 1 and the pictures of the substream 2 are alternately decoded. The decoded image data of each picture is input to the dpb (decoded picture buffer: non-compressed data). In this example, the number of delay pictures from when the decoding is performed to when display is started is 4 pictures.

It should be noted that in the above, R1 and R2 represent the example of the fixed bit rate (constant_bit_rate). However, it is not limited thereto, and the same idea can be applied to a variable bit rate (variable_bit_rate).

Figure 15:
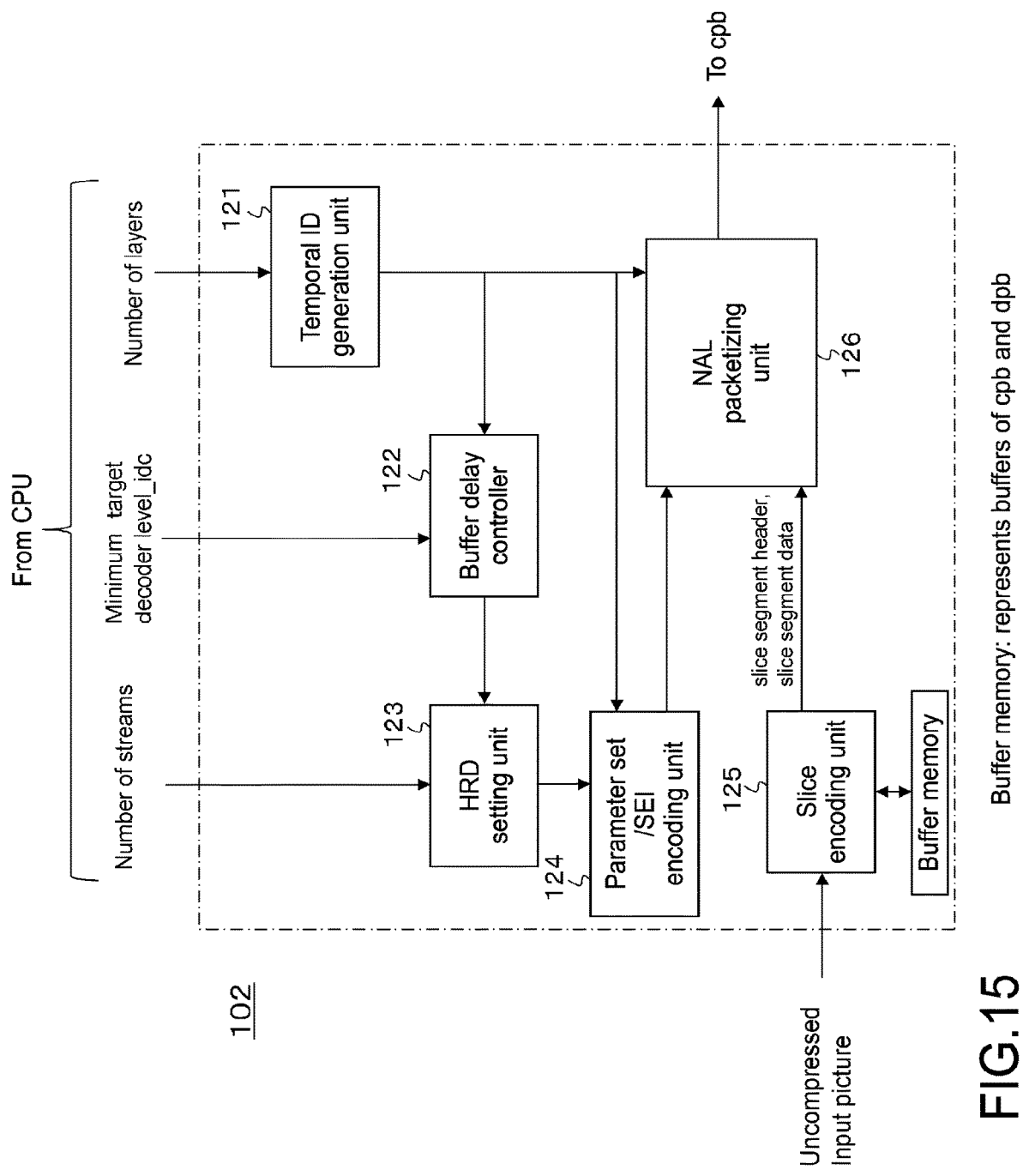
FIG. 15 A block diagram showing a configuration example of the encoder.

FIG. 15 shows a configuration example of the encoder 102. The encoder 102 includes a temporal ID generation unit 121, a buffer delay controller 122, an HRD (Hypothetical Reference Decoder) setting unit 123, a parameter set/SEI encoding unit 124, a slice encoding unit 125, and a NAL packetizing unit 126.

To the temporal ID generation unit 121, information on the number of hierarchies (Number of layers) is supplied from the CPU 101. The temporal ID generation unit 121 generates a temporal_id depending on the number of hierarchies based on the information on the number of hierarchies. For example, in the example of the hierarchical coding shown in FIG. 3, temporal_ids of 0 to 4 are generated.

To the buffer delay controller 122, information of minimum decoding capability (minimum_target_decoder_level_idc) is supplied from the CPU 101, and the temporal_id generated in the temporal ID generation unit 121 is supplied. The buffer delay controller 122 calculates "initial_cpb_removal_delay" being an initial value of cpb buffering for each video stream, and "cpb removal delay" and "dpb output delay" for each picture.

The buffer delay controller 122 controls "Cpb_removal_delay" in the cpb buffer for each substream (Sub-stream). The buffer delay controller 122 performs the control so that a buffer failure does not occur between the decoding timing of the decoder and the display timing in the dpb buffer. In this case, "cpb_removal_delay" is controlled so that the decoding timing of the picture of the lowest hierarchy set is a regular interval. Moreover, in this case, "cpb_removal_delay" is controlled so that the encoding timing of the coded image data of the picture in the hierarchy set higher than the lowest hierarchy set is an average timing of the encoding timings of the coded image data of the pictures of all hierarchy sets lower than the hierarchy set. Moreover, "dpb_output_delay" is controlled so that a cpb buffer failure does not occur. It should be noted that the encoding timing represents the same meaning as the decoding timing read from the compressed data buffer (cpb: coded picture buffer) on the receiver side.

To the HRD (Hypothetical Reference Decoder) setting unit 123, "cpb_removal_delay" and "dpb_output_delay" of the picture of each video stream calculated in the buffer delay controller 122 is supplied, and the information on the number of streams (Number of streams) is supplied from the CPU 101. The HRD setting unit 123 performs HRD setting based on the information.

To the parameter set/SEI encoding unit 124, HRD setting information and a temporal_id are supplied. The parameter set/SEI encoding unit 124 generates parameter sets of each hierarchy such as VPS, SPS, and PPS, and SEI, depending on the number of streams to be coded.

For example, a picture timing SEI including "cpb_removal_delay" and "dpb_output_delay" (Picture timing SEI) is generated. In addition, for example, a buffering period SEI including "initial_cpb_removal_time" (Buffering Period SEI) is generated. The buffering period SEI is generated corresponding to the top picture of GOP (access unit).

The "initial cpb removal time" represents time (initial time) for taking the coded image data of the top picture of GOP (Group Of Pictures) from the compressed data buffer (cpb) for decoding. The "cpb_removal_delay" represents time for taking the coded image data of each picture from the compressed data buffer (cpb), and the time is determined together with "initial_cpb_removal_time." Moreover, the "dpb_output_delay" represents time for taking after decoding and entering the compressed data buffer (dpb).

The slice encoding unit 125 encodes the image data of the picture of each hierarchy to acquire slice data (slice segment header, slice segment data). The slice encoding unit 125 uses a frame buffer to insert "ref_idx_l0_active (ref_idx_l1_active)" representing the index of the picture predicted by the "Prediction Unit" in "slice segment header" as information representing the prediction state of the time direction. Accordingly, when decoding is performed, the hierarchy level shown by the temporal_id as well as the reference picture is determined. Moreover, the slice encoding unit 125 inserts the index of the current slice in the "slice segment header" as "short_term_ref_pic_set_idx" or "it_idx_sps."

The NAL packetizing unit 126 generates the coded image data of each hierarchy based on the parameter set and SEI generated by the parameter set/SEI encoding unit 124 and the slice data amount generated by the slice encoding unit 125 to output video streams (coded streams) depending on the number of streams.

At this time, a temporal id representing the hierarchy is added to the NAL unit header for each picture (see, FIG. 4). Moreover, the picture that belongs to the hierarchy shown by the temporal_id is tied up as a sublayer (sub layer), and the level designation value "level_idc" of the bit rate for each sublayer is regarded as "sublayer_level_idc" and is inserted in VPS or SPS.

Figure 16:
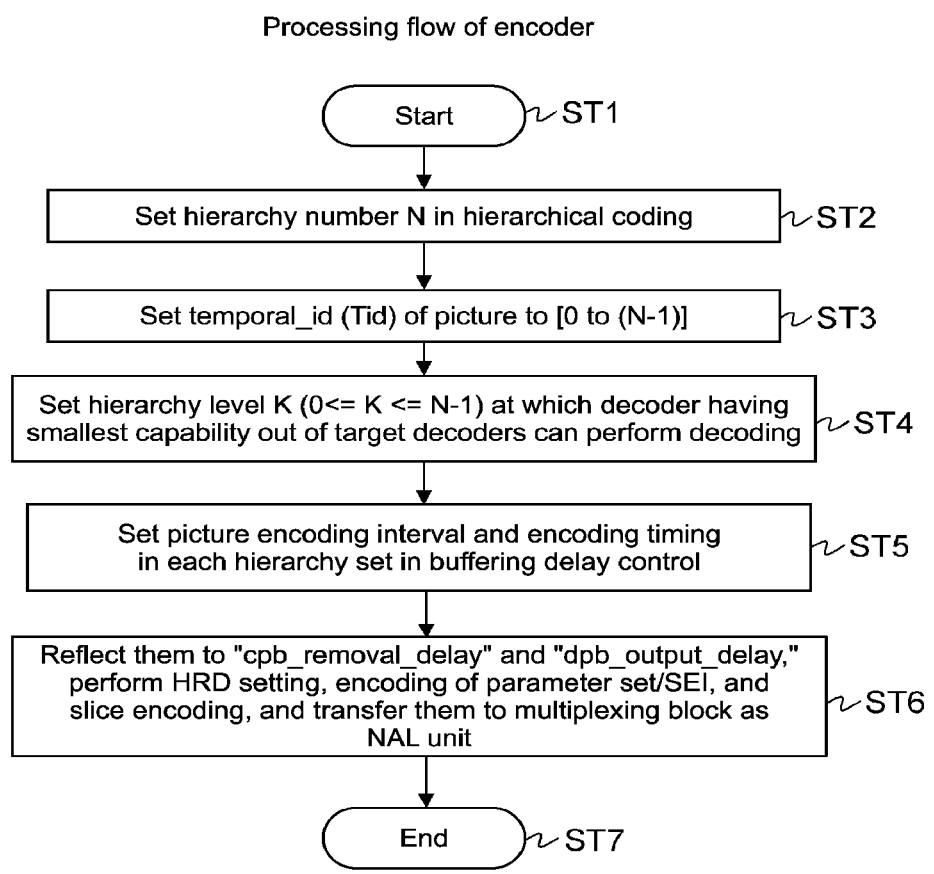
FIG. 16 A diagram showing an example of processing flow of the encoder.

FIG. 16 shows processing flow of the encoder 102. The encoder 102 starts processing in step ST1, and after that, performs processing of step ST2. In step ST2, the encoder 102 sets the hierarchy number N in the hierarchical coding. Next, the encoder 102 sets the temporal_id of the picture of each hierarchy to 0 to (N−1) in step ST3.

Next, the encoder 102 sets a hierarchy level K at which the decoder having the smallest capability out of target decoders can perform decoding to 0 to N−1 in step ST4. Then, the encoder 102 sets the picture encoding interval and the encoding timing in each hierarchy set in the buffer delay controller 122 in step ST5.

Next, the encoder 102 reflects the picture encoding interval and the encoding timing obtained in step ST5 to "cpb_removal_delay" and "dpb_output_delay," performs HRD setting, encoding of the parameter set/SEI, and slice encoding, and transfers them to a multiplexing block as a NAL unit in step ST6. After that, the encoder 102 finishes the processing in step ST7.

Now, return to FIG. 2. The compressed data buffer (cpb) 103 temporarily stores the video stream including the coded data of the picture of each hierarchy generated by the encoder 102. The multiplexer 104 reads the video stream stored in the compressed data buffer 103, and PES-packetizes, transport-packetizes, and multiplexes it to acquire the transport stream TS serving as a multiplexed stream.

The transport stream TS includes a predetermined number of video streams having the coded image data of the picture of each hierarchy set obtained by dividing a plurality of hierarchies, as described above. The multiplexer 104 inserts the identification information for identifying each of the predetermined number of video streams is the base stream or the enhanced stream in the transport stream TS. In this case, the identification information is inserted as the stream type in the video elementary stream loop (Video ES loop) arranged corresponding to each of the predetermined number of video streams under the program map table.

In this case, the stream type of the base stream is "0x24." Moreover, the stream type of the enhanced stream is newly defined. For example, it is "0x25." It should be noted that in the case where there are a plurality of enhanced streams, the stream types of all of the enhanced streams do not have to be the same and a plurality of stream types may be newly defined as the stream types of the enhanced streams so that each enhanced stream can be identified. For example, in the case where there are two enhanced streams, the stream type of a first enhanced stream is "0x25," and the stream type of a second enhanced stream is "0x26."

The multiplexer 104 inserts the configuration information of the video stream in the layer of the transport stream TS so as to correspond to the predetermined number of streams. The multiplexer 104 inserts the configuration information as a descriptor in the video elementary stream loop arranged corresponding to each of the predetermined number of video streams under the program map table.

The multiplexer 104 inserts a multistream descriptor (multistream_descriptor) to be newly defined as well as a HEVC descriptor (HEVC_descriptor). FIG. 17 shows a structural example (Syntax) of the HEVC descriptor (HEVC_descriptor). The 8 bit field of "descriptor_tag" represents the descriptor type, and represents HEVC descriptor, here. The 8 bit field of "descriptor_length" represents the length of the descriptor (size), and represents the number of subsequent bytes as the length of the descriptor.

The 8 bit field of "level idc" represents the level designation value of a bit rate. Moreover, in the case where "temporal_layer_subset_flag=1," there are the 5 bit field of "temporal_id_min" and the 5 bit field of "temporal_id_max." The "temporal_id_min" represents the value of the temporal_id in the lowest hierarchy of the hierarchically coded data included in the corresponding video stream. The "temporal_id_max" represents the value of the temporal id in the highest hierarchy of the hierarchically coded data of the corresponding video stream.

FIG. 18 shows a structure example (Syntax) of the multistream descriptor (multistream_descriptor). Moreover, FIG. 19 shows the content (Semantics) of the main information in the structural example.

The 8 bit field of the "multistream_descriptor_tag" represents the descriptor type, and represents the multistream descriptor, here. The 8 bit field of the "multistream_descriptor_length" represents the length (size) of the descriptor, and represents the number of subsequent bytes as the length of the descriptor. Here, it represents 2 bytes. The 4 bit field of the "group_id" represents the ID of the group associated in a series of services. In this case, the base stream (base stream) and all of the non-base stream (non-base stream=enhanced stream) based thereon have the same id.

The 4 bit field of the "stream_dependency_ordering" defines the dependence relationship between streams starting from the base stream (base stream) in ascending order. The "0001" represents a basic stream. The "0010" represents a second stream from the basic stream (enhanced stream). The "0011" represents a third stream from the basic stream. The "max_layer_in_group" represents the maximum value in the hierarchy coded in the group.

FIG. 20 shows an example of "Stream type," "Group_id," "max/min layer," "max_layer_in_group," and "Stream_dependency ordering" in the case where the transport stream TS includes a video stream group of a service 1 (SERVICE 1) and a service 2 (SERVICE 2), for example.

In this example, as the video stream of the service 1, three video streams of the base stream (Base stream), the enhanced stream (Enhanced stream 1), and the enhanced stream (Enhanced stream 2) are included. In the service 1, the value of the "Group_id" is "0." Moreover, in the service 1, the number of hierarchies is 5 and the value of the "max/min layer" is "4," similarly to the example of the hierarchical coding shown in FIG. 3.

Moreover, the service 1 is divided into three hierarchy sets. The value of the "Stream type" of the base stream is set to "0x24," and the "max/min layer" of the HEVC descriptor represents to include pictures in the hierarchies 0 to 2. Moreover, the value of the "Stream_type" of the enhanced stream (Enhanced stream 1) is set to "0x25," and the "max/min layer" of the HEVC descriptor represents to include the picture in the hierarchy 3. Furthermore, the value of the "Stream_type" of the enhanced stream (Enhanced stream 2) is set to "0x25," and the "max/min layer" of the HEVC descriptor represents to include the picture in the hierarchy 4.

Moreover, in this example, as the video stream of the service 2, three video streams of the base stream (Base stream), the enhanced stream (Enhanced stream 1), and the enhanced stream (Enhanced stream 2) are included. In the service 2, the value of the "Group_id" is "1." Moreover, in the service 2, the number of hierarchies is 4, and the value of the "max/min layer" is "3," for example.

Moreover, the service 2 is divided into three hierarchy sets. The value of the "Stream_type" of the base stream is set to "0x24," and the "max/min layer" of the HEVC descriptor represents to include pictures of the hierarchies 0 to 1. Moreover, the value of "Stream_type" of the enhanced stream (Enhanced stream 1) is set to "0x25," and the "max/min layer" of the HEVC descriptor represents to include the picture in the hierarchy 2. Furthermore, the value of the "Stream_type" of the enhanced stream (Enhanced stream 2) is set to "0x25," and the "max/min layer" of the HEVC descriptor represents to include the picture in the hierarchy 3.

Figure 21:
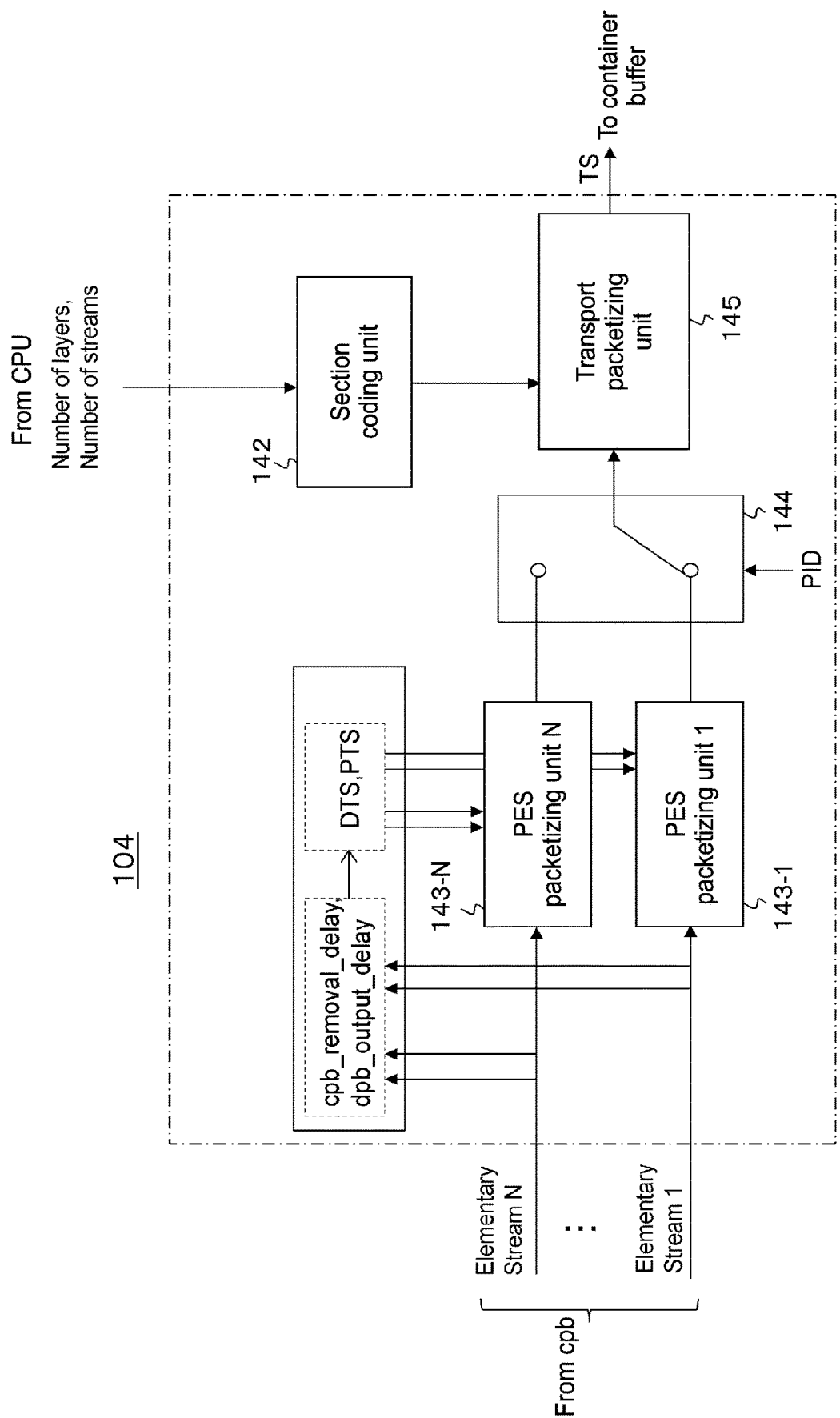
FIG. 21 A block diagram showing a configuration example of a multiplexer.

FIG. 21 shows a configuration example of the multiplexer 104. The multiplexer 104 includes a section coding unit 142, PES packetizing units 143-1 to 143-N, a switching unit 144, and a transport packetizing unit 145.

The PES packetizing units 143-1 to 143-N read video streams 1 to N stored in the compressed data buffer 103, respectively, and generate PES packets. Here, the video streams 1 to N each includes one base stream and at least one enhanced stream.

At this time, the PES packetizing units 143-1 to 143-N add the time stamp of DTS (Decoding Time Stamp) and PTS (Presentation Time Stamp) to the PES header based on the HRD information of the video streams 1 to N, respectively. In this case, "cpu_removal_delay" and "dpb_output_delay" of each picture are referred to, DTS and PTS are generated with the precision in sync with the STC (System Time Clock) time, and arranged at a predetermined position in the PES header.

The switching unit 144 selectively takes PES packets generated in the PES packetizing units 143-1 to 143-N based on the packet identifier (PID), and transmits it to the transport packetizing unit 145. The transport packetizing unit 145 generates a TS packet including the PES packet in the payload to obtain the transport stream TS.

The section coding unit 142 generates various kinds of section data to be inserted in the transport stream TS. to the section coding unit 142, information such as the number of hierarchies (Number of layers) and the number of streams (Number of streams) is supplied from the CPU 101. The section coding unit 142 generates the above-mentioned HEVC descriptor (HEVC_descriptor) and multistream descriptor (multistream_descriptor) based on the information.

The section coding unit 142 transmits the various kinds of section data to the transport packetizing unit 145. The transport packetizing unit 145 generates a TS packet including the section data, and inserts it in the transport stream TS. It should be noted that at this time, also the stream type is inserted in the video elementary stream loop (Video ES loop) arranged corresponding to each video stream. In this case, the stream type of the base stream is "0x24," and the stream type of the enhanced stream is newly defined as "0x25," for example.

Figure 22:
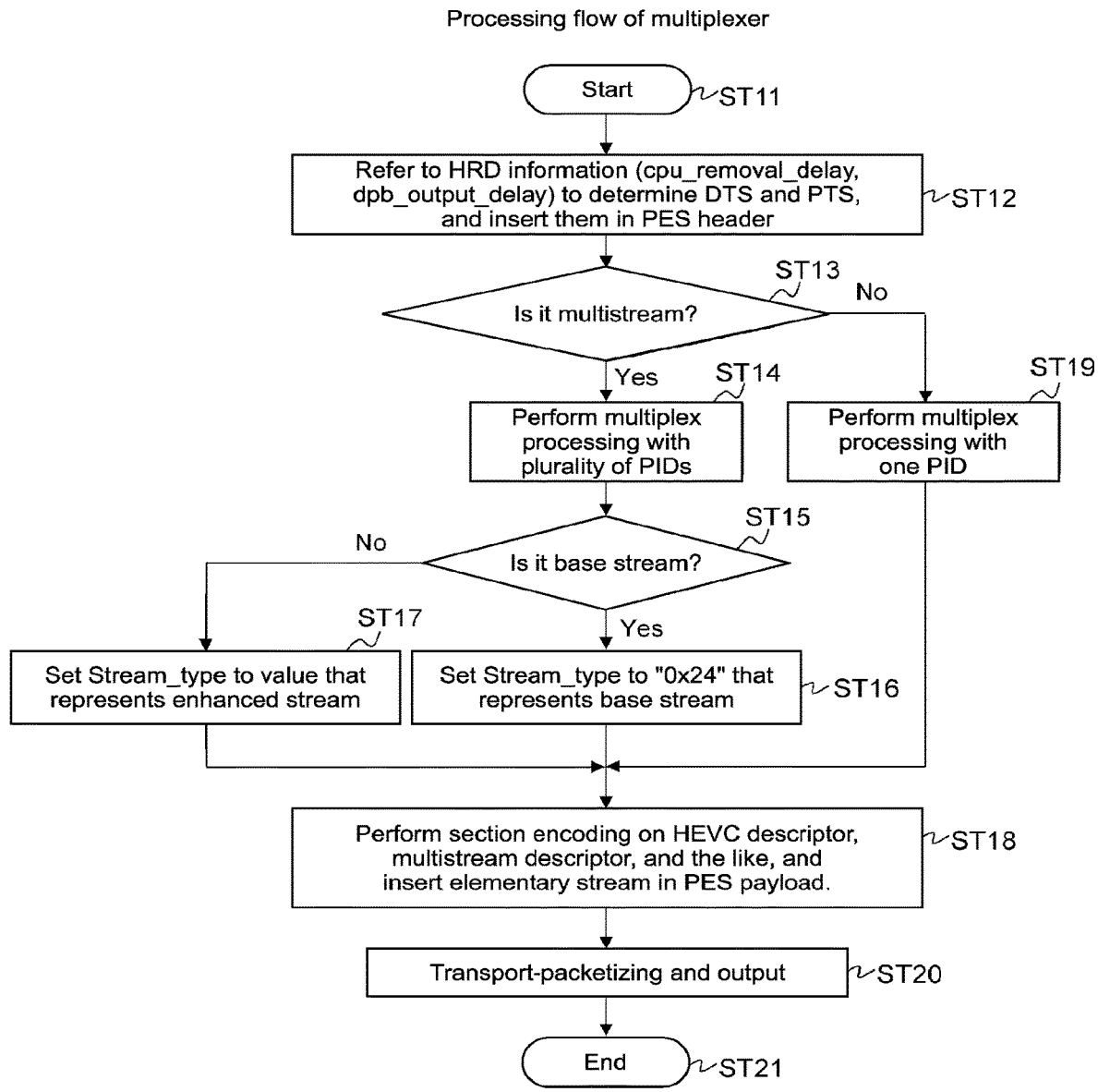
FIG. 22 A diagram showing an example of processing flow of the multiplexer.

FIG. 22 shows the processing flow of the multiplexer 104. The multiplexer 104 starts the processing in step ST11, and thereafter, performs the processing of step ST12. in step ST12, the multiplexer 104 refers to the HRD information (cpu_removal_delay, dpb_output_delay) to determine DTS and PTS, and inserts them in a predetermined position in the PES header.

Next, the multiplexer 104 determines whether or not it is multistream, i.e., N is plural number in step ST13. If it is multistream, the multiplexer 104 performs multiplex processing with a plurality of PIDs in step ST14. Then, the multiplexer 104 determines whether or not it is the base stream in step ST15.

If it is the base stream, the multiplexer 104 sets the stream type to "0x27" in step ST16, and thereafter performs the processing of step ST10. On the other hand, if it is the enhanced stream, the multiplexer 104 sets the stream type to a value that represents the enhanced stream, e.g., newly defined as "0x28" in step ST17, and thereafter performs the processing of step ST18.

It should be noted that if it is not the multistream in step ST13, the multiplexer 104 performs multiplex processing with one PID in step ST19 and thereafter performs the processing of step ST18.

In step ST18, the multiplexer 104 performs section coding on the HEVC descriptor, multistream descriptor, and the like, inserts the coded stream (video elementary stream) in the PES payload for PES packetization. Then, the multiplexer 104 performs transport-packetization in step ST20 to obtain the transport stream TS. After that, the multiplexer 104 finishes the processing in step ST21.

Figure 23:
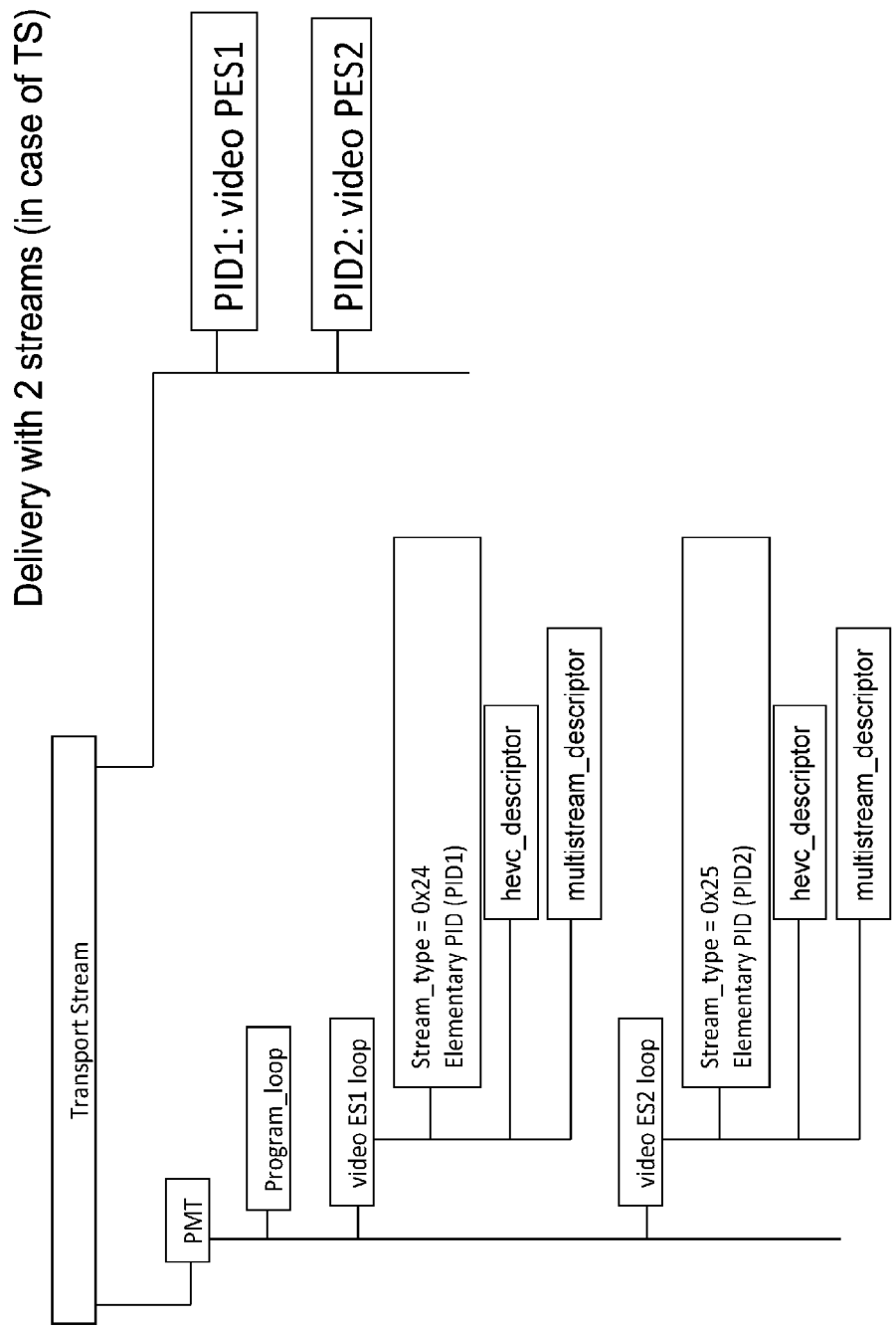
FIG. 23 A diagram showing a configuration example of the transport stream TS in 2 stream delivery.

FIG. 23 shows a configuration example of the transport stream TS in the case where a service is delivered with two streams. The transport stream TS includes two video streams of the base stream and the enhanced stream. Specifically, in this configuration example, there are a PES packet "video PES1" of the base stream and a PES packet "video PES2" of the enhanced stream.

Moreover, the transport stream TS includes a PMT (Program Map Table) as one of PSI (Program Specific Information). This PSI is information that represents which program each elementary stream included in the transport stream belongs to.

In the PMT, there is a program loop (Program loop) to which information related to the entire program is written. Moreover, in the PMT, there is an elementary stream loop having information related to each video stream. In this configuration example, there are a video elementary stream loop "video ES1 loop" corresponding to the base stream and a video elementary stream loop "video ES2 loop" corresponding to the enhanced stream.

On the "video ES1 loop," information such as the stream type and the packet identifier (PID) is arranged corresponding to the base stream (video PES1), and also a descriptor to which information related to the video stream is written is arranged. This stream type is "0x24" that represents the base stream. Moreover, as one of the descriptor, the above-mentioned HEVC descriptor and multistream descriptor are inserted.

Moreover, on the "video ES2 loop," information such as the stream type and the packet identifier (PID) is arranged corresponding to the enhanced stream (video PES2), and also a descriptor to which information related to the video stream is written is arranged. This stream type is, for example, newly defined as "0x25" that represents enhanced stream. Moreover, as one of the descriptor, the above-mentioned HEVC descriptor and multistream descriptor are inserted.

Figure 24:
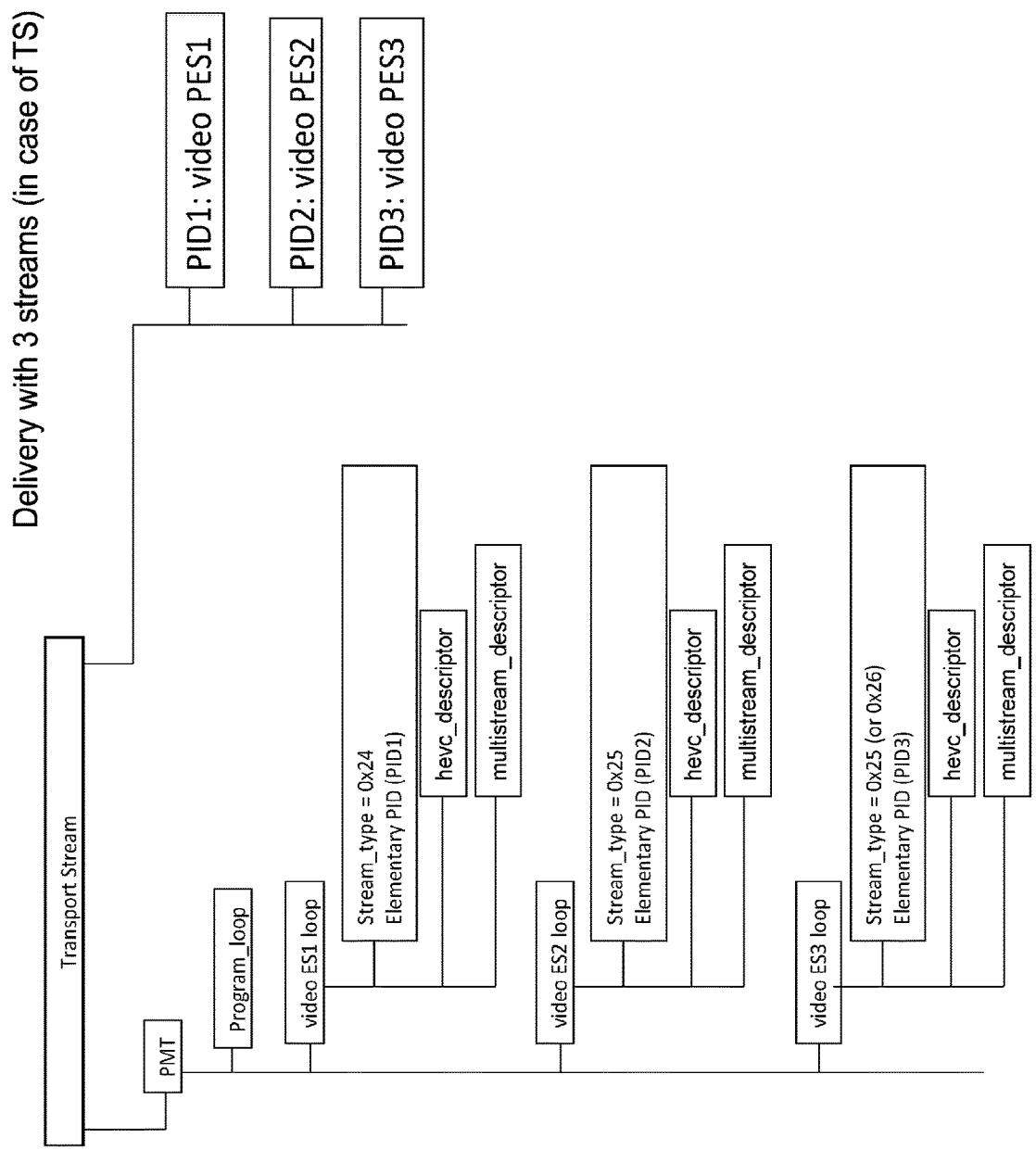
FIG. 24 A diagram showing a configuration example of the transport stream TS in 3 stream delivery.

FIG. 24 shows a configuration example of the transport stream TS in the case where a service is delivered with three streams. The transport stream TS includes three streams of the base stream and two enhanced streams. Specifically, in this configuration example, there are a PES packet "video PES1" of the base stream and PES packets "video PES2" and "video PES3" of the enhanced streams.

Moreover, in the PMT, there is an elementary stream loop having information related to each video stream. In this configuration example, there are a video elementary stream loop "video ES1 loop" corresponding to the base stream and a video elementary stream loop "video ES2 loop" and a video elementary stream loop "video ES3 loop" corresponding to the two enhanced streams.

On the "video ES1 loop," information such as the stream type and the packet identifier (PID) is arranged corresponding to the base stream (video PES1), and a descriptor to which information related to the video stream is written is arranged. This stream type is "0x24" that represents the base stream. Moreover, as one of the descriptor, the above-mentioned HEVC descriptor and multistream descriptor are inserted.

Moreover, on the "video ES2 loop," information such as the stream type and the packet identifier (PID) is arranged corresponding to the enhanced stream (video PES2), and also a descriptor to which information related to the video stream is written is arranged. This stream type is, for example, newly defined as "0x25" that represents the enhanced stream. Moreover, as one of the descriptor, the above-mentioned HEVC descriptor and multistream descriptor are inserted.

Moreover, on the "video ES3 loop", information such as the stream type and the packet identifier (PID) is arranged corresponding to the enhanced stream (video PES3), and also a descriptor to which information related to the video stream is written is arranged. This stream type is, for example, newly defined as "0x25" or "0x26" that represents the enhanced stream. Moreover, as one of the descriptor, the above-mentioned HEVC descriptor and multistream descriptor are inserted.

Now, return to FIG. 2. The transmission unit 105 modulates the transport stream TS in a modulation form suitable for broadcasting such as QPSK/OFDM, and transmits an RF modulation signal from a transmission antenna.

The operation of the transmission apparatus 100 shown in FIG. 2 will be simply described. To the encoder 102, non-compressed moving image data is input. The encoder 102 performs hierarchical coding on the moving image data. Specifically, in the encoder 102, the image data of each picture constituting the moving image data is classified into a plurality of hierarchies and is coded to generate a video stream having the coded image data of the picture in each hierarchy. At this time, the coding is performed so that the referred picture belongs to a self-hierarchy and/or a hierarchy lower than the self-hierarchy.

In the encoder 102, a plurality of hierarchies are divided into a predetermined number of hierarchy sets, and a predetermined number of video streams having the coded image data of the picture in each hierarchy set is generated. In this case, the base stream having the coded image data of the picture in the lowest hierarchy set is generated, and a predetermined number of enhanced streams having the coded image data of the picture in the hierarchy set higher than the lowest hierarchy set is generated.

The predetermined number of video streams generated in the encoder 102 is supplied to the compressed data buffer (cpb) 103, and is temporarily stored. In the multiplexer 104, each video stream stored in the compressed data buffer 103 is read, PES-packetized, transport-packetized, and multiplexed to obtain the transport stream TS as the multiplexed stream.

Moreover, in the multiplexer 104, identification information for identifying whether the predetermined number of video streams is the base stream or the enhanced stream is inserted in the layer of the transport stream TS. The identification information is the stream type to be inserted in the video elementary stream loop (Video ES loop) arranged corresponding to each video stream. In this case, the stream type of the base stream is "0x24," and the stream type of the enhanced stream is, for example, newly defined as "0x25."

Moreover, in the multiplexer 104, the configuration information of the video stream is inserted in the layer of the transport stream TS corresponding to the predetermined number of video streams. Specifically, in the multiplexer 104, the HEVC descriptor and the multistream descriptor are inserted in the video elementary stream loop corresponding to each video stream.

The transport stream TS generated in the multiplexer 104 is transmitted to the transmission unit 105. In the transmission unit 105, the transport stream TS is modulated in the modulation method suitable for broadcasting such as QPSK/OFDM, and an RF modulation signal is transmitted from the transmission antenna.

[Configuration of Reception Apparatus]

Figure 25:
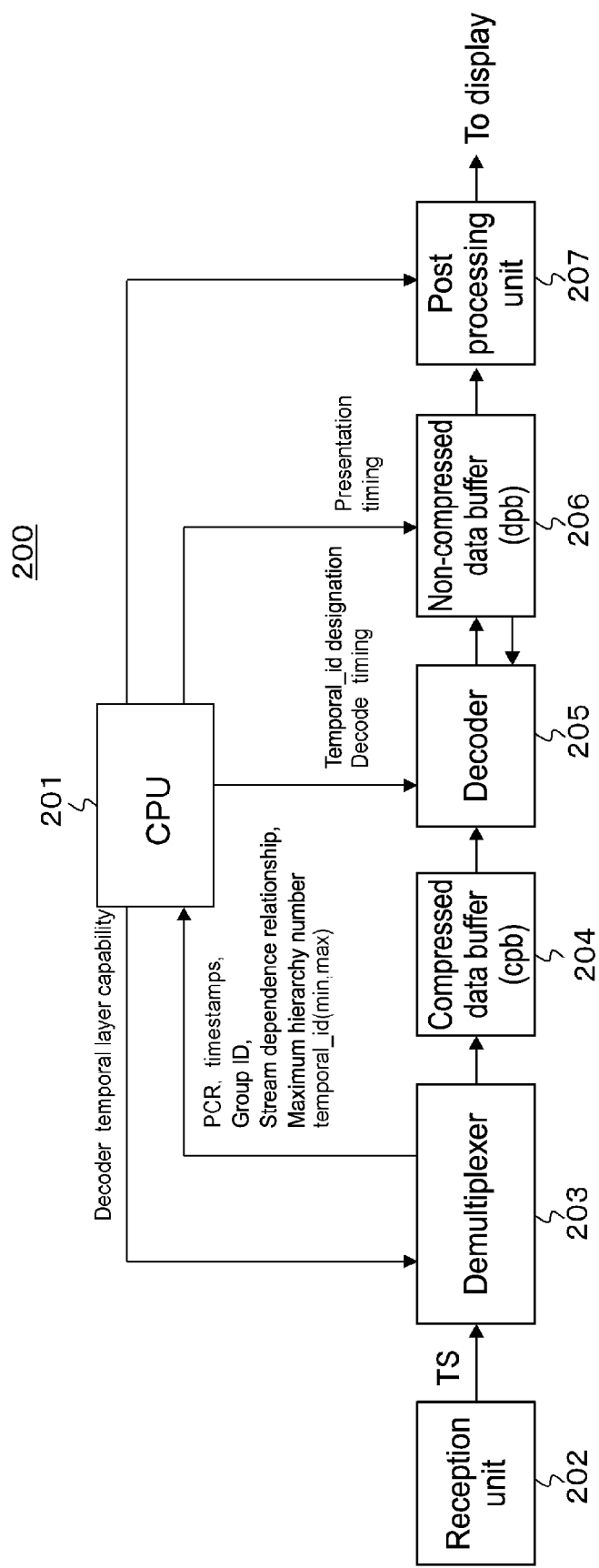
FIG. 25 A block diagram showing a configuration example of a reception apparatus.

FIG. 25 shows a configuration example of the reception apparatus 200. the reception apparatus 200 includes a CPU (central processing unit) 201, a reception unit 202, a demultiplexer 203, and a compressed data buffer (cpb: coded picture buffer) 204. Moreover, the reception apparatus 200 includes a decoder 205, a non-compressed data buffer (dpb: decoded picture buffer) 206, and a post processing unit 207. The CPU 201 constitutes a controller, and controls the operation of the respective units of the reception apparatus 200.

The reception unit 202 demodulates an RF modulation signal received by a reception antenna to acquire the transport stream TS. The demultiplexer 203 selectively takes the coded image data of the picture in the hierarchy set depending on the decoding capability (Decoder temporal layer capability) from the transport stream TS, and transmit it to the compressed data buffer (cpb: coded picture buffer) 204.

Figure 26:
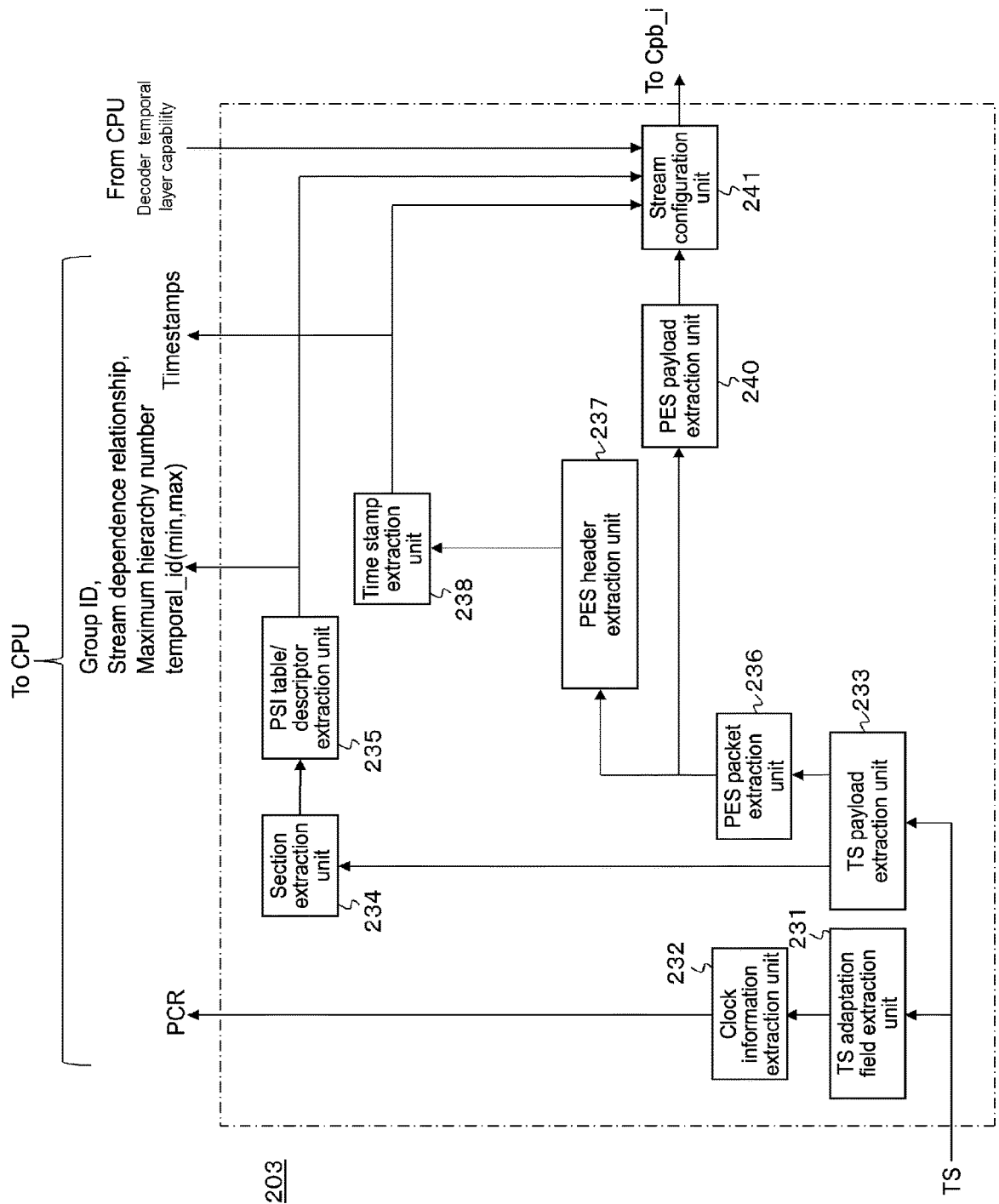
FIG. 26 A block diagram showing a configuration example of a demultiplexer.

FIG. 26 shows a configuration example of the demultiplexer 203. The demultiplexer 203 includes a TS adaptation field extraction unit 231, a clock information extraction unit 232, a TS payload extraction unit 233, a section extraction unit 234, a PSI table/descriptor extraction unit 235, and a PES packet extraction unit 236. Moreover, the demultiplexer 203 includes a PES header extraction unit 237, a time stamp extraction unit 238, a PES payload extraction unit 240, and a stream configuration unit (stream composer) 241.

The TS adaptation field extraction unit 231 extracts an adaptation field from the TS packet having the adaptation field of the transport stream TS. The clock information extraction unit 232 extracts a PCR (Program Clock Reference) from the adaptation field including the PCR, and transmits it to the CPU 201.

The TS payload extraction unit 233 extracts a TS payload of the transport stream TS from the TS packet including the TS payload. The section extraction unit 234 extracts section data from the TS payload including the section data. The PSI table/descriptor extraction unit 235 analyzes the section data extracted by the section extraction unit 234, and extracts a PSI table or a descriptor. Then, the PSI table/descriptor extraction unit 235 transmits the minimum value (min) and the maximum value (max) of the temporal_id, the maximum hierarchy number, the stream dependence relationship, the group id, and the like, to the CPU 201 and to the stream configuration unit 241.

The PES packet extraction unit 236 extracts a PES packet from the TS payload including the PES packet. The PES header extraction unit 237 extracts a PES header from the PES packet extracted by the PES packet extraction unit 236. The time stamp extraction unit 238 extracts a time stamp (DTS, PTS) inserted in the PES header for each picture, and transmits it to the CPU 201 and the stream configuration unit 241.

The PES payload extraction unit 240 extracts the PES payload, i.e., coded image data of the picture in each hierarchy, from the PES packet extracted by the PES packet extraction unit 236. The stream configuration unit 241 selectively takes, from the coded image data of the picture in each hierarchy to be taken out by the PES payload extraction unit 240, only the base stream or the coded image data of the picture of the predetermined number of enhanced streams, and transmits it to the compressed data buffer (cpb: coded picture buffer) 204. In this case, the stream configuration unit 241 refers to hierarchy information acquired by the PSI table/descriptor extraction unit 235, for example.

For example, the case where the frame rate of the predetermined number of video streams (coded streams) included in the transport stream TS is 120 fps will be discussed. For example, a plurality of hierarchies are divided into two hierarchy sets of a lower hierarchy set and a higher hierarchy set, and the frame rates of the pictures in the hierarchy sets are 60 fps. For example, in the above-mentioned example of the hierarchical coding shown in FIG. 3, the hierarchies 0 to 3 are the lower hierarchy set, and the decoder that supports the level_idc of 60 fps can perform the decoding. Moreover, the hierarchy 4 is the higher hierarchy set, and the decoder that supports the level_idc of 120 fps can perform the decoding.

In the case where the decoding capability supports 120 fps, the stream configuration unit 241 takes the coded image data of the base stream and the enhanced stream based on the packet ID (PID), and transmits it to the compressed data buffer (cpb: coded picture buffer) 204. On the other hand, in the case where the decoding capability supports not 120 fps but 60 fps, the stream configuration unit 241 takes only the coded image data of the picture of the base stream based on the packet ID (PID), and transmits it to the compressed data buffer (cpb: coded picture buffer) 204.

Figure 27:
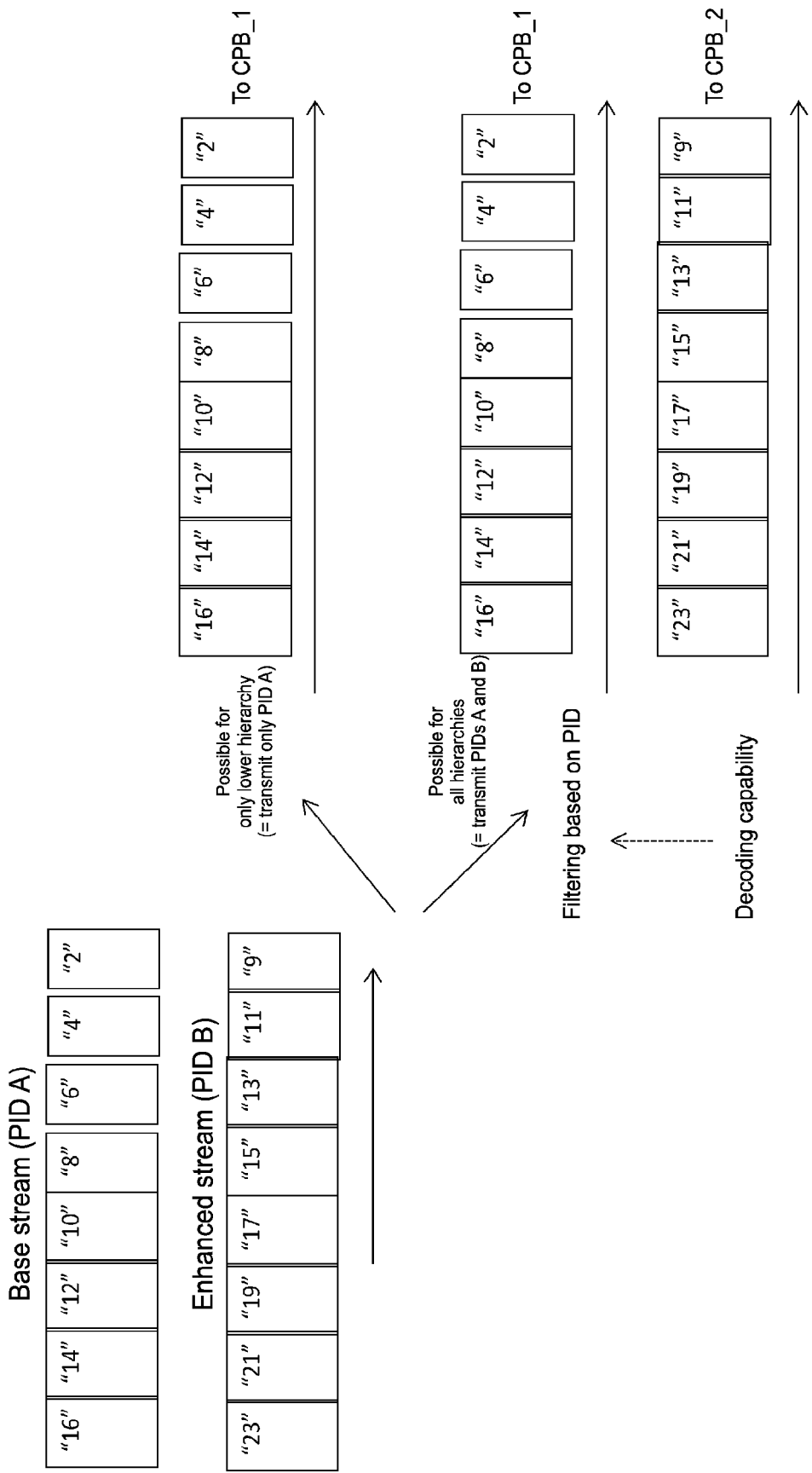
FIG. 27 A diagram showing an example of stream selection.

FIG. 27 shows an example of picture (slice) selection by the stream configuration unit 241 in the case where the transport stream TS includes two video streams (coded streams) of the base stream and the enhanced stream. The packet identifier (PID) of the base stream is a PID A and the packet identifier (PID) of the enhanced stream is a PID B. The example shown in the figure corresponds to the above-mentioned example shown in FIG. 9 and shows only the portion of the n-th sub-picture group (Sub group of pictures), and the number added to each picture shown by a rectangular frame represents the decoding order (encoding order on the transmission side).

In the case where the decoding capability supports 120 fps, the stream configuration unit 241 performs filtering based on the packet identifier (PID), takes the coded image data of the pictures of the base stream being the PID A and the enhanced stream being the PID B, and transmits it to the compressed data buffer (cpb: coded picture buffer) 204. In this case, the coded image data of the picture of the base stream is stored in an area 1 (cpb_1), and the coded image data of the picture of the enhanced stream is stored in an area 2 (cpb_2).

On the other hand, in the case where the decoding capability supports not 120 fps but 60 fps, the stream configuration unit 241 performs filtering based on the packet identifier (PID), takes only the coded image data of the picture of the base stream being PID A, transmits it to the compressed data buffer (cpb: coded picture buffer) 204, and stores it in the area 1 (cpb_1).

Figure 28:
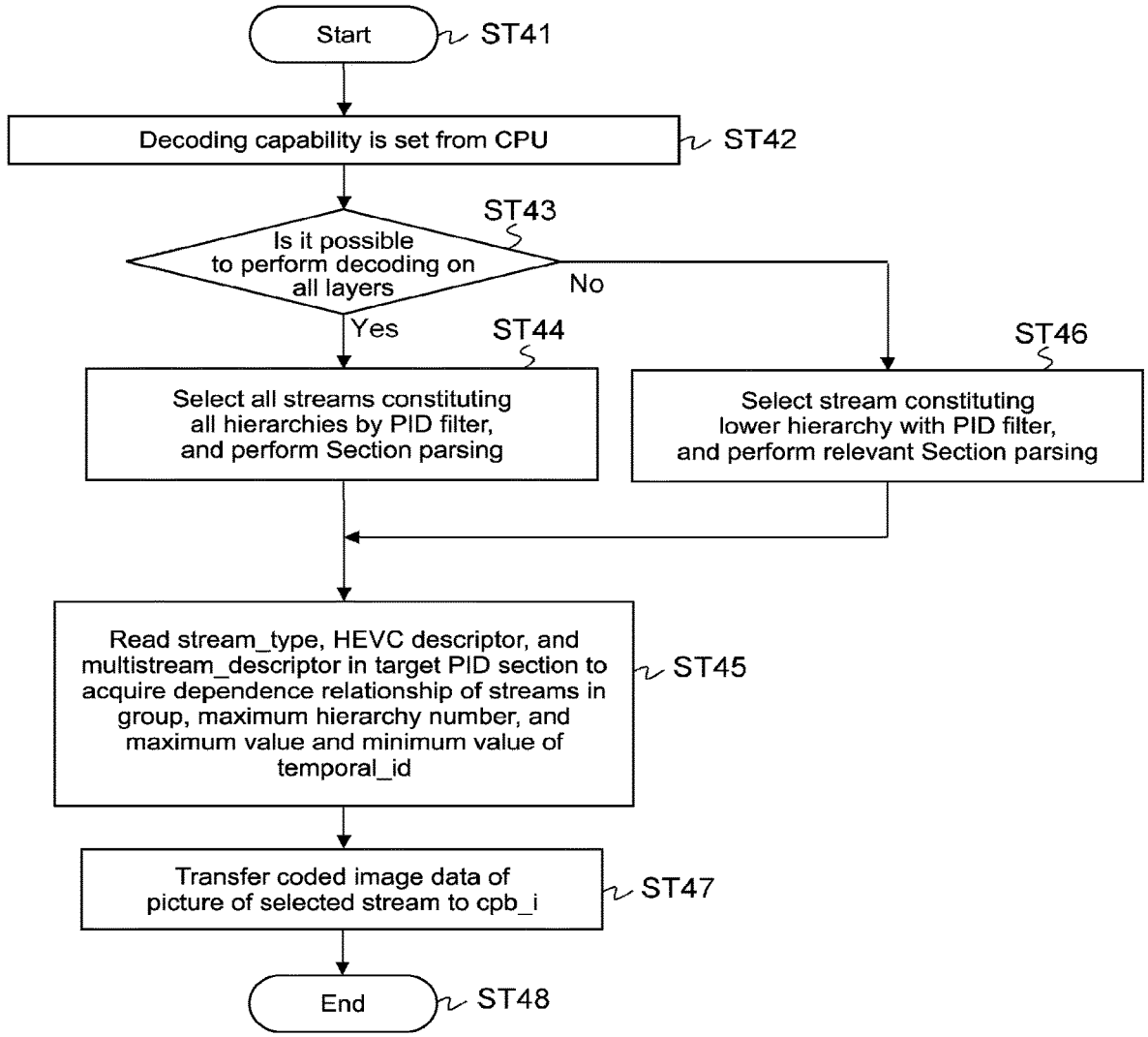
FIG. 28 A diagram showing an example of processing flow of the demultiplexer.

FIG. 28 shows an example of processing flow of the demultiplexer 203. This processing flow shows the case where the transport stream TS includes the base stream having the coded image data of the picture in the lowest hierarchy set and the predetermined number of enhanced streams having the coded image data of the picture in the predetermined number of hierarchy sets higher than the lowest hierarchy set.

The demultiplexer 203 starts processing in step ST41, and thereafter performs the processing of step ST42. In step ST42, the decoding capability (Decoder temporal layer capability) is set from the CPU 201. Next, the demultiplexer 203 determines whether or not it is possible to perform decoding on the all hierarchies (layers) in step ST43.

In the case where it is possible to perform decoding on all of the hierarchies, the demultiplexer 203 selects all streams constituting all of the hierarchies by a PID filter, and performs section parsing (Section parsing) in step ST44. After that, the demultiplexer 203 performs the processing of step ST45.

In the case where it is not possible to perform decoding on all of the hierarchies in step ST43, the demultiplexer 203 selects a predetermined number of streams including the base stream constituting the lower hierarchy that can be decoded, and performs relevant section parsing (Section parsing) in step ST46. After that, the demultiplexer 203 performs the processing of step ST45.

In step ST45, the demultiplexer 203 reads the HEVC descriptor and the multistream descriptor in the target PID section to acquire the dependence relationship of the streams in the group, the maximum hierarchy number, and the maximum value and the minimum value of the temporal_id.

Next, the demultiplexer 203 transfers the coded image data of the picture of the stream selected in step ST44 or step ST46 to the compressed data buffer (cpb: coded picture buffer) 204 in step ST47. After the processing of the step ST47, the demultiplexer 203 finishes the processing in step ST48.

Now, return to FIG. 25. The compressed data buffer (cpb) 204 temporarily stores the video stream (coded stream) taken out by the demultiplexer 203. The decoder 205 takes, from the video stream stored in the compressed data buffer 204, the coded image data of the picture in the hierarchy designated as hierarchy to be decoded. Then, the decoder 205 decodes the coded image data of each picture thus taken out at the decoding timing of the picture, and transmits it to the non-compressed data buffer (dpb) 206.

Here, in the decoder 205, the hierarchy to be decoded is designated with the temporal id from the CPU 201. The designated hierarchy is regarded as all hierarchies or a part of lower hierarchies included in the video stream (coded stream) taken out by the demultiplexer 203, and is automatically set by the CPU 201 or set according to a user's operation. Moreover, to the decoder 205, a decoding timing is given from the CPU 201 based on the DTS (Decoding Time Stamp). It should be noted that the decoder 205 reads and use the image data of the referred picture from the non-compressed data buffer 206 as necessary when the coded image data of each picture is decoded.

Figure 29:
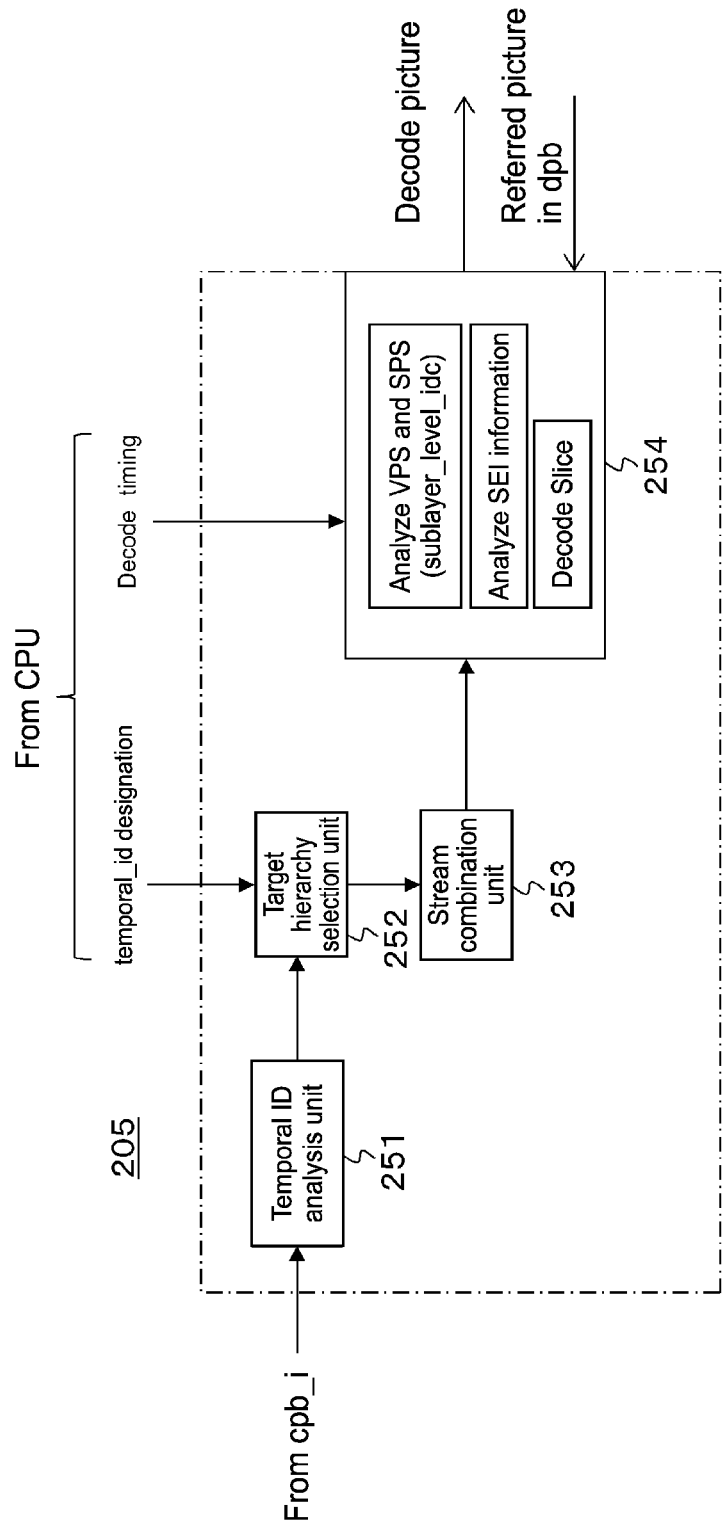
FIG. 29 A block diagram showing a configuration example of a decoder.

FIG. 29 shows a configuration example of the decoder 205. The decoder 205 includes a temporal ID analysis unit 251, a target hierarchy selection unit 252, a stream combination unit 253, and a decoding unit 254. The temporal ID analysis unit 251 reads the video stream (coded stream) stored in the compressed data buffer 204, and analyzes the temporal_id inserted in the NAL unit header of the coded image data of each picture.

The target hierarchy selection unit 252 takes, from each video stream read from the compressed data buffer 204, the coded image data of the picture in the hierarchy designated as the hierarchy to be decoded based on the analysis results obtained from the temporal ID analysis unit 251. In this case, from the target hierarchy selection unit 252, one or more video stream (coded stream) is output depending on the number of video streams read from the compressed data buffer 204 and the designated hierarchy.

Figure 30:
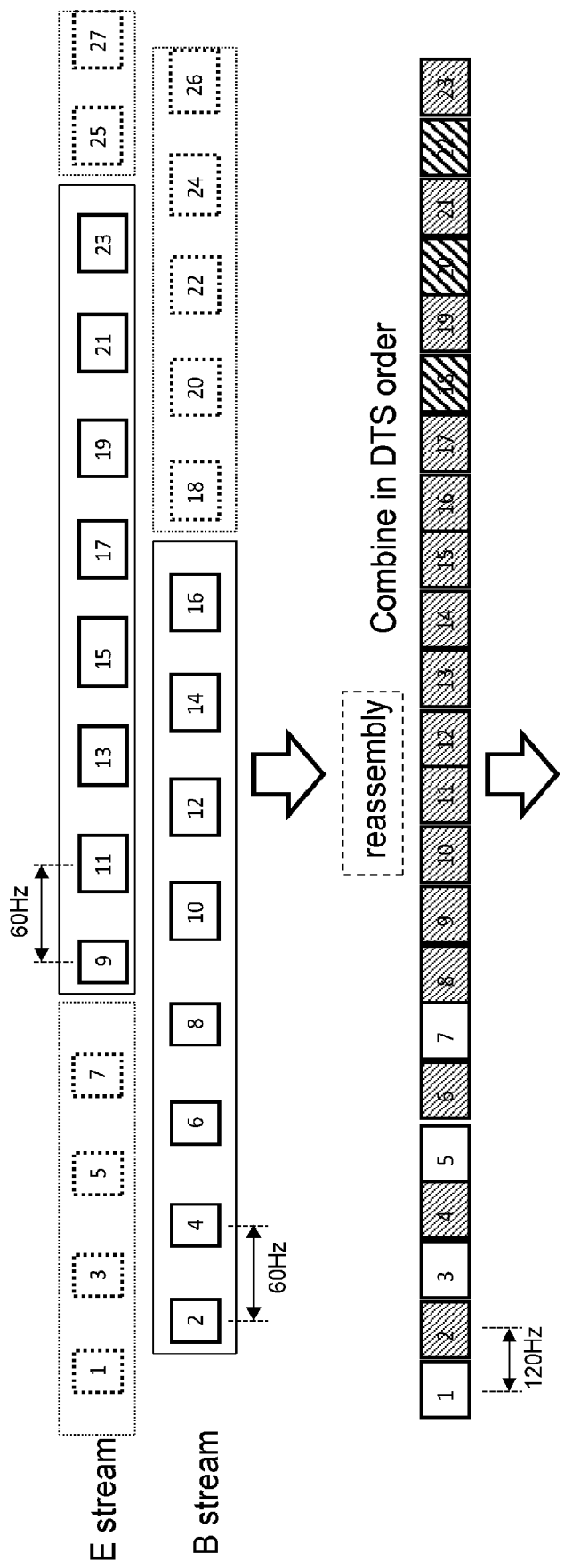
FIG. 30 A diagram showing an example of stream combination.

The stream combination unit 253 combines the video streams (coded streams) output from the target hierarchy selection unit 252 together. It should be noted that although it differs from that shown in the figure, the stream combination unit 253 may combine the video streams (coded streams) output from the cpb buffer 204 together. In this case, the stream combination unit 253 simultaneously performs the target hierarchy selection and the temporal ID analysis. The stream combination unit 253 combines the coded image data of the pictures together based on the decoding timing information. FIG. 30 shows an example of stream combination.

This example corresponds to the above-mentioned example shown in FIG. 9, and is an example in which the pictures of the base stream with intervals of 60 Hz and the pictures of the enhanced stream with intervals of 60 Hz are combined together. In this case, each picture is regarded as one stream of a time stamp of 120 Hz.

It should be noted that the one stream is transmitted to the decoding unit 254, and each of the coded image data of the picture is decoded at the decoding timing and is stored in the dpb (non-compressed data buffer) 206, as will be described later. After that, the image data of each picture is sequentially read from the non-compressed data buffer 206 after reordering of the pictures. In the example shown in the figure, the picture in a sub-picture group (shown by the downward-sloping hatching) is read first, and then, the picture in the next sub-picture group (shown by the upward-sloping hatching) is read. After the decoding, the picture in the next sub-picture group is stored in the non-compressed data buffer 206 during the picture in a sub-picture group is displayed, and becomes a subsequent referred picture.

It should be noted that the combination processing itself of the pictures of the plurality of streams may be performed for the plurality of selected streams in the above-mentioned demultiplexer 203, and may be transferred to the compressed data buffer (cpb: coded picture buffer) 204 as one stream. Also the combination processing at this time is performed based on the decoding timing information similarly. In this case, the combination processing does not need to be performed in the decoder.

The decoding unit 254 sequentially decodes the coded image data of each picture of the video stream (coded stream) combined by the stream combination unit 253 at the decoding timing, and transmits it to the non-compressed data buffer (dpb) 206.

In this case, the decoding unit 254 analyzes the VPS and SPS, grasps the level designation value "sublayer_level_idc" of the bit rate for each sublayer, for example, to check whether or not it can be decoded with the decoding capability. Moreover, in this case, the decoding unit 254 performs SEI analysis, grasps "initial_cpb_removal_time" and "cpb_removal_delay," for example, and checks whether or not the decoding timing from the CPU 201 is appropriate.

The decoding unit 254 acquires "ref_idx_10_active (ref_idx_11_active)" from the slice header (Slice header) as information representing the prediction destination of the time direction when decoding the slice (Slice) to predict the time direction. It should be noted that the picture after decoding is processed as reference by another picture with the "short_term_ref_pic_set_idx" or "it_idx_sps" obtained from the slice header (slice header) as an index.

Now, return to FIG. 25. The con-compressed data buffer (dpb) 206 temporarily stores the image data of each picture decoded by the decoder 205. The post processing unit 207 performs processing to match the frame rate of the image data of each picture sequentially read from the non-compressed data buffer (dpb) 206 at the display timing with the display capability. In this case, the display timing is given from the CPU 201 based on the PTS (Presentation Time Stamp).

For example, if the frame rate of the image data of each picture after decoding is 120 fps and the display capability is 120 fps, the post processing unit 207 transmits the image data of each picture after decoding to the display as it is. Moreover, for example, if the frame rate of the image data of each picture after decoding is 120 fps and the display capability is 60 fps, the post processing unit 207 performs sub-sampling processing so that the time direction resolution is reduced by half against the image data of each picture after decoding, and transmits it to the display as the image data of 60 fps.

Moreover, for example, if the frame rate of the image data of each picture after decoding is 60 fps and the display capability is 120 fps, the post processing unit 207 performs interpolation processing so that the time direction resolution is doubled against the image data of each picture after decoding, and transmits it to the display as the image data of 120 fps. Moreover, for example, if the frame rate of the image data of each picture after decoding is 60 fps and the display capability is 60 fps, the post processing unit 207 transmits the image data of each picture after decoding to the display as it is.

Figure 31:
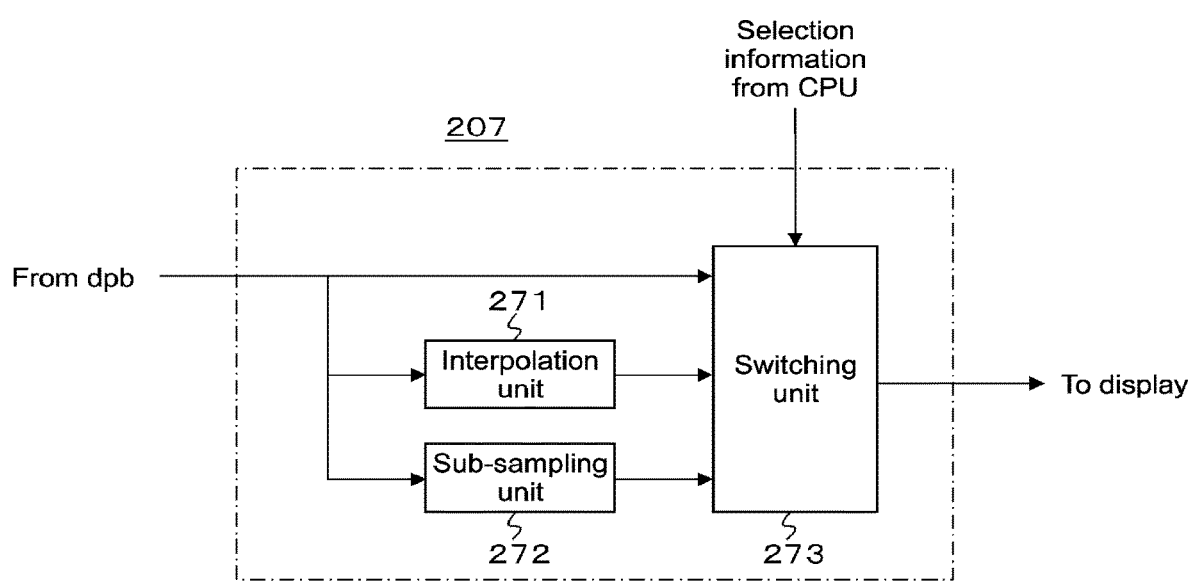
FIG. 31 A diagram showing a configuration example of a post processing unit.

FIG. 31 shows a configuration example of the post processing unit 207. This is an example in which it is possible to process the case where the frame rate of the image data of each picture after decoding is 120 fps or 60 fps as described above, and the display capability is 120 fps or 60 fps.

The post processing unit 207 includes an interpolation unit 271, a sub-sampling unit 272, and a switching unit 273. The image data of each picture after decoding from the non-compressed data buffer 206 is directly input to the switching unit 273, input to the switching unit 273 after the frame rate is doubled by the interpolation unit 271, or input to the switching unit 273 after the frame rate is reduced by half by the sub-sampling unit 272.

To the switching unit 273, selection information is supplied from the CPU 201. This selection information is automatically generated by the CPU 201 referring to the display capability, or is generated according to a user's operation. The switching unit 273 selectively outputs any of the input based on the selection information. Accordingly, the frame rate of the image data of each picture sequentially read from the non-compressed data buffer (dpb) 206 at the display timing is regarded as one that matches the display capability.

Figure 32:
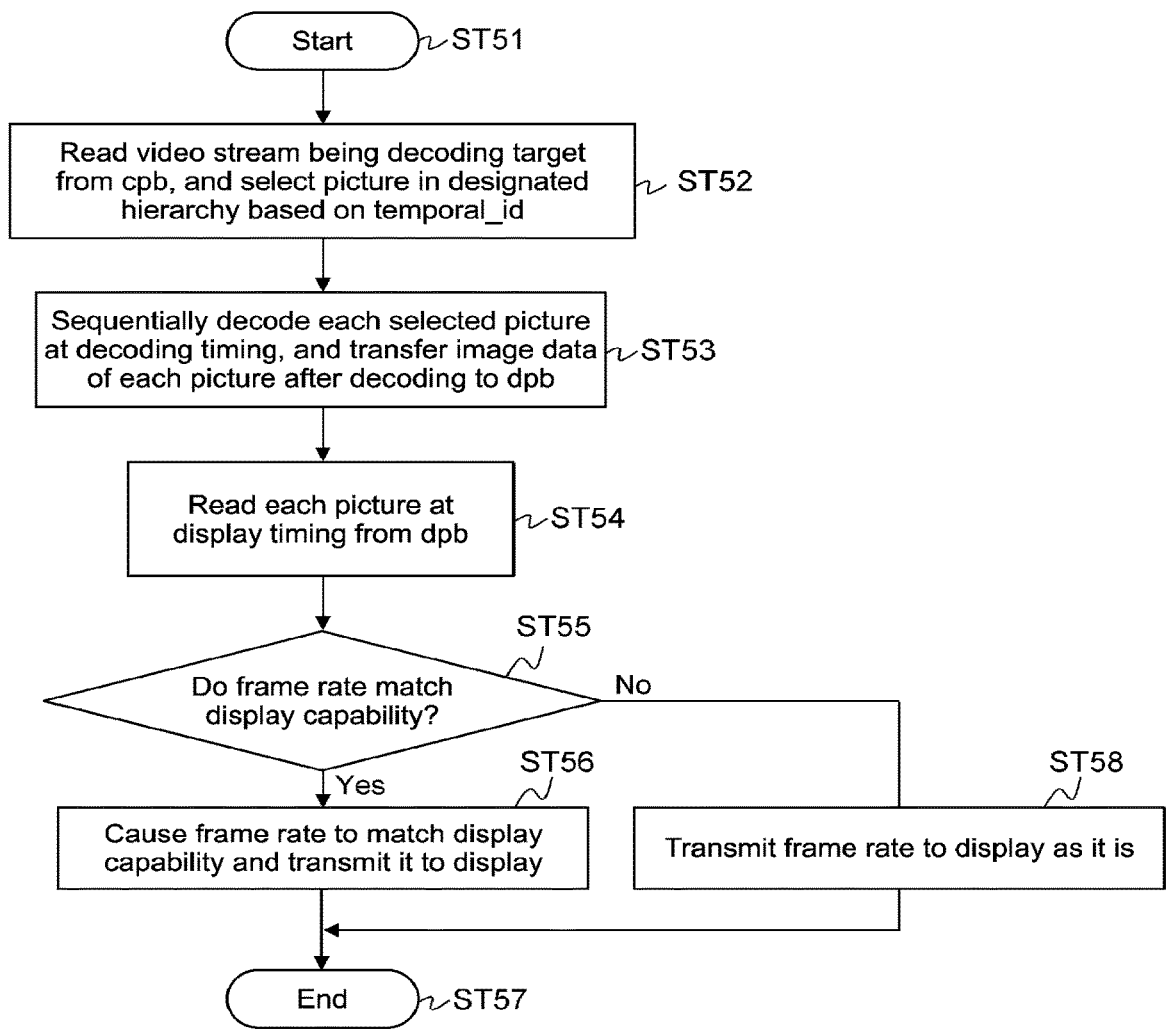
FIG. 32 A diagram showing an example of processing flow of the post processing unit.

FIG. 32 shows an example of processing flow of the decoder 205 and the post processing unit 207. The decoder 205 and the post processing unit 207 start processing in step ST51, and thereafter perform the processing of step ST52. In this step ST52, the decoder 205 reads the video stream being the decoding target, which is stored in the compressed data buffer (cpb: coded picture buffer) 204, and selects the picture in the hierarchy designated as a target from the CPU 201 based on the temporal_id.

Next, the decoder 205 sequentially decodes the coded image data of each of the selected pictures at the decoding timing, transfers the image data of each picture after decoding to the non-compressed data buffer (dpb) 206, and temporarily stores it in step ST53. Next, the post processing unit 207 reads the image data of each picture at the display timing from the non-compressed data buffer (dpb) 206 in step ST54.

Next, the post processing unit 207 determines whether or not the frame rate of the read image data of each picture matches the display capability. If the frame rate does not match the display capability, the post processing unit 207 causes the frame rate to match the display capability and transmits it to the display in step ST56, and finishes the processing in step ST57. On the other hand, if the frame rate matches the display capability, the post processing unit 207 transmits the frame rate to the display as it is in step ST58, and thereafter finishes the processing in step ST57.

The operation of the reception apparatus 200 shown in FIG. 25 will be simply described. In the reception unit 202, an RF modulation signal received by a reception antenna is demodulated to acquire the transport stream TS. This transport stream TS is transmitted to the demultiplexer 203. In the demultiplexer 203, all or a part of video streams are PID-filtered from the transport stream TS depending on the decoding capability (Decoder temporal layer capability).

For example, if the decoding capability is high, all of the video streams of the base stream and the enhanced stream are selected. Moreover, for example, if the decoding capability is low, a predetermined number of video streams that include a decodable hierarchy and the base stream are selected. Then, the coded image data of the picture of the selected video stream is transmitted from the demultiplexer 203 to the compressed data buffer (cpb: coded picture buffer) 204, and is temporarily stored.

In the decoder 205, the coded image data in the hierarchy designated as the hierarchy to be decoded is taken out from the video stream stored in the compressed data buffer 204. Then, in the decoder 205, the coded image data of each picture thus-taken out is decoded at the decoding timing, is transmitted to the non-compressed data buffer (dpb) 206, and is temporarily stored. In this case, the image data of the referred picture is read from the non-compressed data buffer 206 as necessary when the coded image data of each picture is decoded, and is used.

The image data of each picture sequentially read from the non-compressed data buffer (dpb) 206 at the display timing is transmitted to the post processing unit 207. In the post processing unit 207, interpolation or sub-sampling for matching the frame rate of the image data of each picture with the display capability is performed. The image data of each picture processed in the post processing unit 207 is supplied to the display, and moving images of the image data of each picture are displayed.

As described above, in the transmission/reception system 10 shown in FIG. 1, coding is performs so that at least the decoding interval of the coded image data of the picture in the lowest hierarchy set is a regular interval on the transmission side. Therefore, in the case where the receiver has the decoding capability to perform processing on the coded image data of the pictures in the plurality of hierarchies of the lowest hierarchy set, for example, it is possible to continuously and effortlessly perform decoding processing on the coded image data of each picture.

Moreover, in the transmission/reception system 10 shown in FIG. 1, coding is performed so that the decoding timing of the coded image data of the picture in the hierarchy set higher than the lowest hierarchy set is an average decoding timing for the coded image data of the pictures in all of the hierarchy sets lower than the hierarchy set on the transmission side. Therefore, in the case where the receiver has decoding capability to decode the coded image data of the picture not only in the lowest hierarchy set but also in the hierarchy set higher than that, it is possible to sequentially and smoothly perform the decoding processing on each picture.

Moreover, in the transmission/reception system 10 shown in FIG. 1, when the plurality of hierarchies are divided into a predetermined number of hierarchy sets on the transmission side, the division is performed so that the lowest hierarchy set includes a plurality of hierarchies and a hierarchy set higher than the lowest hierarchy set includes one hierarchy. Therefore, in the case where the receiver has the decoding capability to perform processing on the coded image data of the pictures in the plurality of hierarchies of the lowest hierarchy set, it only needs the configuration that selects only a video stream having the coded image data of the picture in the lowest hierarchy set, takes it in a buffer, and performs decoding processing on it, and does not need a complex configuration that performs combination processing on a plurality of video streams, for example.

Moreover, in the transmission/reception system 10 shown in FIG. 1, on the transmission side, identification information for identifying whether each of the predetermined number of video streams is the base stream or the enhanced stream is inserted in the layer of the transport stream TS. Therefore, the receiver can easily select the base stream and selectively decode the coded image data of the picture in the lower hierarchy set by using the identification information, for example.

Moreover, in the transmission/reception system 10 shown in FIG. 1, on the transmission side, the configuration information of the video stream is inserted in the layer of the transport stream TS corresponding to the predetermined number of video streams included in the transport stream TS. Therefore, the receiver can easily grasp, for example, which group each video stream included in the transport stream TS belongs to, what stream dependence relationship there is between the video streams, and what the number of hierarchies.

Moreover, in the transmission/reception system 10 shown in FIG. 1, on the receiver side, the coded image data of the picture in a hierarchy that is equal to or lower than a predetermined hierarchy is selectively taken in the compressed data buffer 204 depending on the decoding capability (Decoder temporal layer capability) from the received video stream, and is decoded. Therefore, it is possible to perform appropriate decoding processing depending on the decoding capability, for example.

Moreover, in the transmission/reception system 10 shown in FIG. 1, on the receiver side, the frame rate of the image data of each picture after decoding is caused to match the display capability in the post processing unit 207. Therefore, even if the decoding capability is low, for example, it is possible to acquire the image data of the frame rate matching the display capability.

2. MODIFIED EXAMPLE

It should be noted that in the above-mentioned embodiment, the "max_layer_in_group" being information of the hierarchy maximum value is written to the multistream descriptor (see FIG. 18), and is transmitted to the receiver. However, instead of writing the information of the hierarchy maximum value to the descriptor and supplying it to the receiver, it is possible to describe that "designate the maximum layer" on the face of a file or paper written standards to designate or set the hierarchy maximum value in the reception apparatus in advance. Also in this case, the receiver refers to the information of the hierarchy maximum value, performs filtering on the stream including the hierarchy depending on the own decoding capability, and performs decoding processing, similarly to the case of supplying it with a descriptor from the transmitter side as described above, Moreover, in the above-mentioned embodiment, an example of the time scalability (temporal scalability) is described, and the multistream descriptor is used to transmit the configuration information of each stream to the receiver. However, although a detailed description will be omitted, it is possible to apply the above-mentioned multistream descriptor in the service in which a basic stream (base stream) and an extended stream (enhanced stream) coexist in relation to scalability such as spatial scalability and bit rate scalability. Specifically, the above-mentioned multistream descriptor represents a useful signaling method when multistream coding is performed.

Moreover, in the above-mentioned embodiment, the transmission/reception system 10 including the transmission apparatus 100 and the reception apparatus 200 has been described. However, the configuration of the transmission/reception system to which the present technology can be applied is not limited thereto. For example, the part of the reception apparatus 200 may have the configuration of a set top box and a monitor connected by a digital interface such as HDMI (High-Definition Multimedia Interface). It should be noted that "HDMI" is a registered trademark.

Moreover, in the above-mentioned embodiment, an example in which the contenna is a transport stream (MPEG-2 TS) has been described. However, the present technology can be applied also to the system having the configuration that uses a network such as the Internet to perform delivery to the reception terminal similarly. In the case of delivery using the Internet, delivery is performed by a contenna in the format of MP4 or the like. In other words, the contenna in the various formats such as the transport stream (MPEG-2 TS) adopted by the digital broadcasting standards and MP4 used by the Internet delivery corresponds to the contenna.

Moreover, the present technology may also take the following configurations.

(1) A coding apparatus, comprising
an image coding unit configured
to classify image data of each picture constituting moving image data into a plurality of hierarchies,
to code the image data of the picture in each of the classified hierarchies,
to divide the plurality of hierarchies into a predetermined number of hierarchy sets, and
to generate a predetermined number of video streams having the coded image data of the picture in each of the divided hierarchy sets, the image coding unit performing coding so that a decoding interval of the coded image data of the picture in at least the lowest hierarchy set is a regural interval.

(2) The coding apparatus according to (1) above, in which the image coding unit performs coding so that a decoding timing for the coded image data of the picture in a hierarchy set higher than the lowest hierarchy set is an average timing of decoding timings for the coded image data of the pictures in all hierarchy sets lower than the hierarchy set.

(3) The coding apparatus according to (1) or (2) above, in which
the image coding unit divides the plurality of hierarchies into the predetermined number of hierarchy sets so that the lowest hierarchy set includes a plurality of hierarchies and a hierarchy set higher than the lowest hierarchy set includes one hierarchy.

(4) A coding method, including:
classifying, by an image coding unit, image data of each picture constituting moving image data into a plurality of hierarchies;
coding the image data of the picture in each of the classified hierarchies;
dividing the plurality of hierarchies into a predetermined number of hierarchy sets; and
generating a predetermined number of video streams having the coded image data of the picture in each of the divided hierarchy sets, the image coding unit performing coding so that a decoding interval of the coded image data of the picture in at least the lowest hierarchy set is a regural interval.

(5) A transmission apparatus, including:
an image coding unit configured
to classify image data of each picture constituting moving image data into a plurality of hierarchies,
to code the image data of the picture in each of the classified hierarchies,
to divide the plurality of hierarchies into a predetermined number of hierarchy sets, and
to generate a predetermined number of video streams having the coded image data of the picture in each of the divided hierarchy sets; and
a transmission unit configured to transmit a contenner including the generated predetermined number of video streams in a predetermined format, the image coding unit performing coding so that a decoding interval of the coded image data of the picture in at least the lowest hierarchy set is a regural interval.

(6) A transmission apparatus, including:
an image coding unit configured
to classify image data of each picture constituting moving image data into a plurality of hierarchies,
to code the image data of the picture in each of the classified hierarchies,
to divide the plurality of hierarchies into a predetermined number of hierarchy sets, and
to generate a predetermined number of video streams having the coded image data of the picture in each of the divided hierarchy sets;
a transmission unit configured to transmit a contenner including the generated predetermined number of video streams in a predetermined format; and
an identification information insertion unit configured to insert, in a layer of the contenna, identification information for identifying whether each of the predetermined number of video streams is a base stream having the coded image data of the picture in the lowest hierarchy set or an enhanced stream having the coded image data of the picture in a hierarchy set higher than the lowest hierarchy set.

(7) The transmission apparatus according to (6) above, in which the contenna is a transport stream, and the identification information insertion unit inserts, as a stream type, the identification information in a video elementary stream loop arranged corresponding to each of the predetermined number of video streams under a program map table.

(8) The transmission apparatus according to (6) or (7) above, in which the image coding unit performs coding so that a decoding interval of the coded image data of the picture in at least the lowest hierarchy set is a regular interval.

(9) The transmission apparatus according to (8) above, in which the image coding unit performs coding so that a decoding timing for the coded image data of the picture in a hierarchy set higher than the lowest hierarchy set is an average timing of decoding timings for the coded image data of the pictures in all hierarchy sets lower than the hierarchy set.

(10) A transmission apparatus, including:

an image coding unit configured to classify image data of each picture constituting moving image data into a plurality of hierarchies, to code the image data of the picture in each of the classified hierarchies, to divide the plurality of hierarchies into a predetermined number of hierarchy sets, and to generate a predetermined number of video streams having the coded image data of the picture in each of the divided hierarchy sets;

a transmission unit configured to transmit a contenner including the generated predetermined number of video streams in a predetermined format; and a configuration information insertion unit configured to insert, in a layer of the container, configuration information of the video stream corresponding to each of the predetermined numbe of video streams included in the container.

(11) The transmission apparatus according to (10) above, in which the configuration information includes information representing a service group to which the video stream belongs.

(12) The transmission apparatus according to (10) or (11) above, in which the configuration information includes information representing a dependence relationship between streams starting from the base stream having the coded image data of the picture in the lowest hierarchy set.

(13) The transmission apparatus according to any one of (10) to (12) above, in which the configuration information includes information representing the number of hierarchies of the plurality of hierarchies classified by the image coding unit.

(14) The transmission apparatus according to any one of (10) to (13) above, in which the container is a transport stream, and the configuration information insertion unit inserts, as a descriptor, the configuration information in a video elementary stream loop arranged corresponding to each of the predetermined number of video streams under a program map table.

(15) A reception apparatus, including:

a reception unit configured to receive a predetermined number of video streams having coded image data of a picture in a hierarchy set of a predetermined number of hierarchy sets, the coded image data being obtained by classifying image data of pictures constituting moving image data into a plurality of hierarchies and coding the image data, the plurality of hierarchies being divided into the predetermined number of hierarchy sets; and a processing unit configured to process the received predetermined number of video streams, at least a video stream of the predetermined number of video streams, which has coded image data of a picture in the lowest hierarchy set, being coded so that decoding interval for each picture is a regular interval.

(16) The reception apparatus according to (15) above, in which the predetermined number of video streams is coded so that a decoding timing for the coded image data of the picture in a hierarchy set higher than the lowest hierarchy set is an average timing of decoding timings for the coded image data of the pictures in all hierarchy sets lower than the hierarchy set.

(17) A reception apparatus, including:

a reception unit configured to receive a predetermined number of video streams having coded image data of a picture in a hierarchy set of a predetermined number of hierarchy sets, the coded image data being obtained by classifying image data of pictures constituting moving image data into a plurality of hierarchies and coding the image data, the plurality of hierarchies being divided into the predetermined number of hierarchy sets; and an image decoding unit configured to selectively take coded image data of a picture in a hierarchy that is equal to or lower than a predetermined hierarchy depending on a decoding capability in a buffer from the predetermined number of video streams included in the received container;

to decode the coded image data of the picture taken in the buffer; and to acquire image data of the picture in the hierarchy that is equal to or lower than the predetermined hierarchy, at least a video stream of the predetermined number of video streams, which has coded image data of a picture in the lowest hierarchy set, being coded so that decoding interval for each picture is a regular interval.

(18) The reception apparatus according to (17) above, in which identification information for identifying whether each of the predetermined number of video streams is a base stream having the coded image data of the picture in the lowest hierarchy set or an enhanced stream having the coded image data of the picture in a hierarchy set higher than the lowest hierarchy set is inserted in a layer of the container, and the image decoding unit takes coded image data of a picture in a predetermined hierarchy set depending on the decoding capability in the buffer from the predetermined number of video streams including the base stream based on the identification information, and decodes it.

(19) The reception apparatus according to (17) or (18) above, in which in the case where the coded image data of the picture in the predetermined hierarchy set is included in a plurality of video streams, the image decoding unit decodes the coded image data of each picture as one stream based on decoding timing information.

(20) The reception apparatus according to any one of (17) to (19) above, further including a post processing unit configured to match a frame rate of the image data of each picture acquired in the image decoding unit with a display capability.

Figure 8:
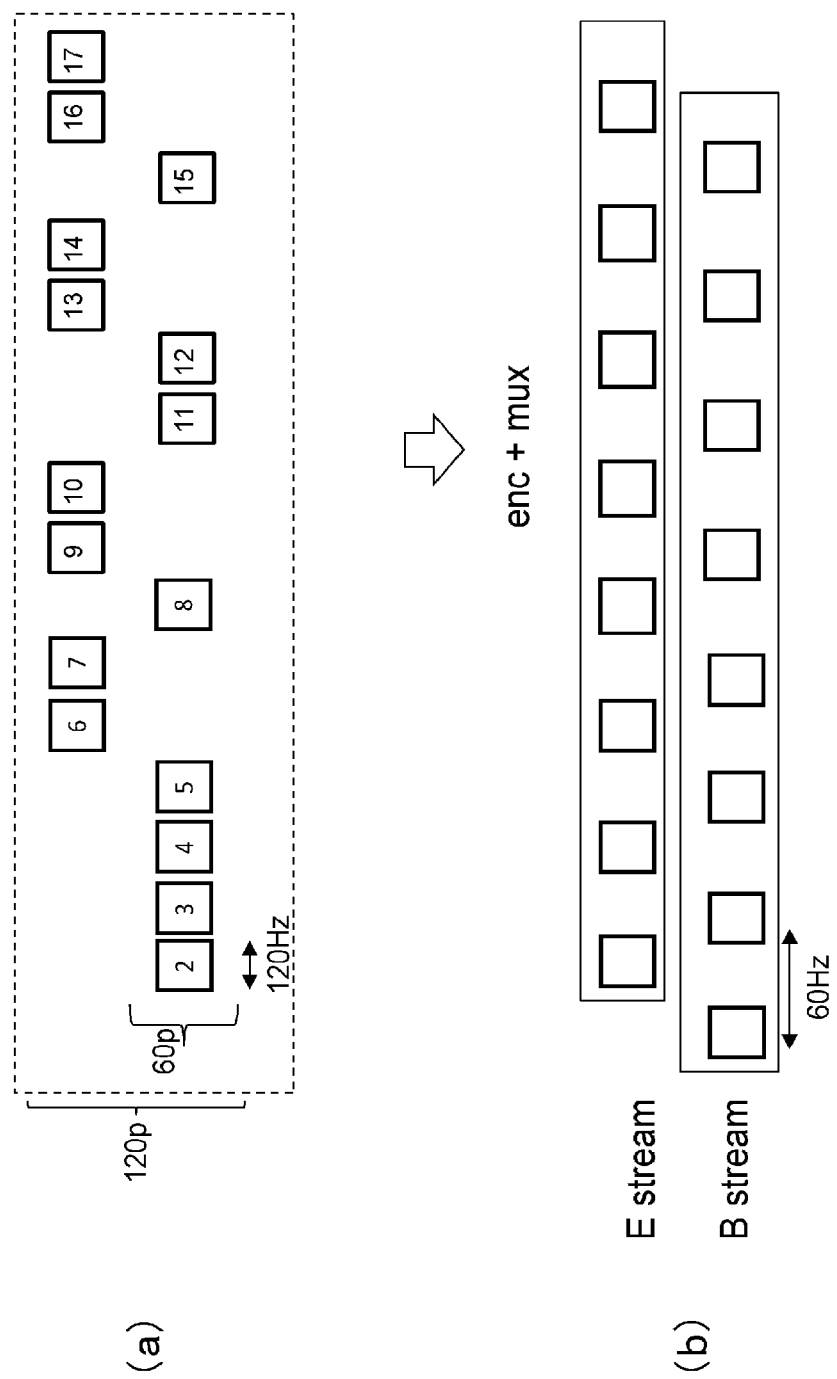
FIG. 8 A diagram for explaining the coding timing (decoding timing) for pictures of a predetermined number of video streams (two streams).
Figure 11:
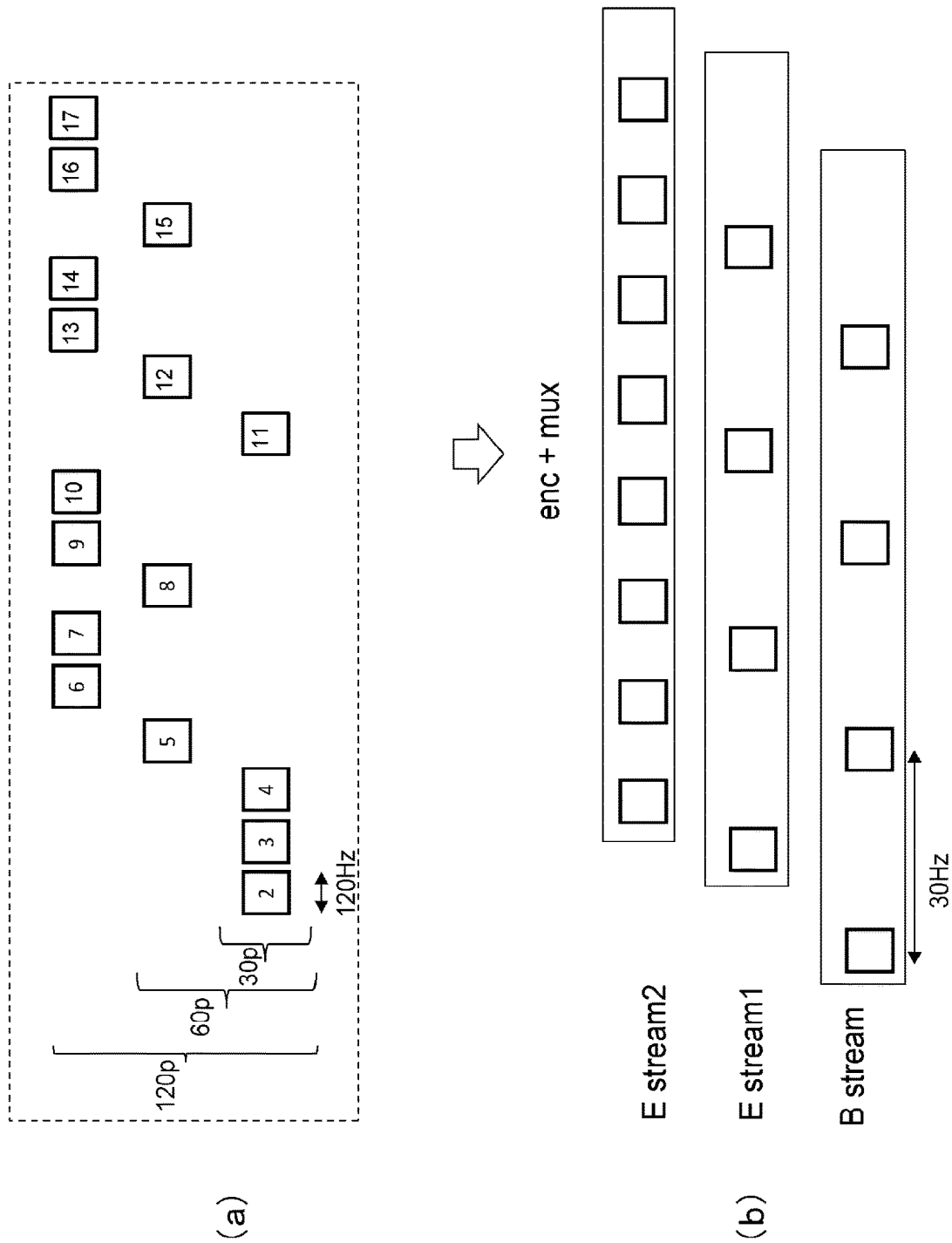
FIG. 11 A diagram for explaining the coding timing (decoding timing) of the pictures of a predetermined number of video streams (3 streams).

The main features of the present technology are to allow a receiver to continuously and effortlessly perform decoding processing on coded image data of each picture if the receiver has the decoding capability to process coded image data of pictures of a plurality of hierarchies included in the lowest hierarchy set by performing decoding so that at least a decoding interval for the coded image data of the picture in the lowest hierarchy set is a regular interval (see FIG. 8, FIG. 11).

In addition, the main features of the present technology are to selectively and easily decode a base stream only, for example, by a receiver using identification information for identifying whether each of a predetermined number of video streams is the base stream or an enhanced stream, by inserting the identification information in a layer of the transport stream TS (see FIG. 20, FIG. 23).

In addition, the main features of the present technology are to allow it to easily know which group the video stream included in the transport stream TS belongs to, what stream-dependent relationship is there, what is the number of hierarchies in the hierarchical coding, and the like, by inserting configuration information of the video stream corresponding to each of the predetermined number of video streams included in the transport stream TS in a layer of the transport stream TS (see FIG. 20, FIG. 23).

DESCRIPTION OF REFERENCE NUMERALS 10 transmission/reception system
100 transmission apparatus
101 CPU
102 encoder
103 compressed data buffer (cpb)
104 multiplexer
105 transmission unit
121 temporal ID generation unit
122 buffer delay controller
123 HRD setting unit
124 parameter set/SEI encoding unit
125 slice encoding unit
126 NAL packetizing unit
142 section coding unit
143-1 to 143-N PES packetizing unit
144 switching unit
145 transport packetizing unit
200 reception apparatus
201 CPU
202 reception unit
203 demultiplexer
204 compressed data buffer (cpb)
205 decoder
206 non-compressed data buffer (dpb)
207 post processing unit
231 TS adaptation field extraction unit
232 clock information extraction unit
233 TS payload extraction unit
234 section extraction unit
235 PSI table/descriptor extraction unit
236 PES packet extraction unit
237 PES header extraction unit
238 time stamp extraction unit
240 PES payload extraction unit
241 stream configuration unit
251 temporal ID analysis unit
252 target hierarchy selection unit
253 stream combination unit
254 decoding unit
271 interpolation unit
272 sub-sampling unit
273 switching unit

The invention claimed is:

1. A coding apparatus, comprising
circuitry configured
to classify image data of each picture constituting moving image data into a plurality of hierarchies,
to code the image data of the picture in each of the classified hierarchies,
to divide the plurality of hierarchies into a predetermined number of hierarchy sets including a lowest hierarchy set, and
to generate a predetermined number of video streams having the coded image data of the picture in each of the divided hierarchy sets, the circuitry performing coding so that a decoding interval of the coded image data of the picture in at least the lowest hierarchy set is a regular interval, wherein
the circuitry performs the coding so that a decoding timing for the coded image data of the picture in a hierarchy set higher than the lowest hierarchy set is an average timing of decoding timings for the coded image data of the pictures in all hierarchy sets lower than the hierarchy set that is higher than the lowest hierarchy set such that a receiver having decoding capacity to decode both the picture in the hierarchy set higher than the lowest hierarchy set and the pictures in said all hierarchy sets lower than the hierarchy set that is higher than the lowest hierarchy set sequentially performs decoding processing on said each picture.

2. The coding apparatus according to claim 1, wherein
the circuitry divides the plurality of hierarchies into the predetermined number of hierarchy sets so that the lowest hierarchy set includes a plurality of hierarchies and a hierarchy set higher than the lowest hierarchy set includes one hierarchy.

3. A coding method, comprising:
classifying, by circuitry, image data of each picture constituting moving image data into a plurality of hierarchies;
coding the image data of the picture in each of the classified hierarchies;
dividing the plurality of hierarchies into a predetermined number of hierarchy sets including a lowest hierarchy set; and
generating a predetermined number of video streams having the coded image data of the picture in each of the divided hierarchy sets, the circuitry performing coding so that a decoding interval of the coded image data of the picture in at least the lowest hierarchy set is a regular interval, wherein
the coding is performed so that a decoding timing for the coded image data of the picture in a hierarchy set higher than the lowest hierarchy set is an average timing of decoding timings for the coded image data of the pictures in all hierarchy sets lower than the hierarchy set that is higher than the lowest hierarchy set such that a receiver having decoding capacity to decode both the picture in the hierarchy set higher than the lowest hierarchy set and the pictures in said all hierarchy sets lower than the hierarchy set that is higher than the lowest hierarchy set sequentially performs decoding processing on said each picture.

4. A transmission apparatus, comprising:
circuitry configured
- to classify image data of each picture constituting moving image data into a plurality of hierarchies,
- to code the image data of the picture in each of the classified hierarchies,
- to divide the plurality of hierarchies into a predetermined number of hierarchy sets including a lowest hierarchy set,
- to generate a predetermined number of video streams having the coded image data of the picture in each of the divided hierarchy sets, and
- to transmit a container including the generated predetermined number of video streams in a predetermined format, the circuitry performing coding so that a decoding interval of the coded image data of the picture in at least the lowest hierarchy set is a regular interval, wherein the circuitry performs the coding so that a decoding timing for the coded image data of the picture in a hierarchy set higher than the lowest hierarchy set is an average timing of decoding timings for the coded image data of the pictures in all hierarchy sets lower than the hierarchy set that is higher than the lowest hierarchy set such that a receiver having decoding capacity to decode both the picture in the hierarchy set higher than the lowest hierarchy set and the pictures in said all hierarchy sets lower than the hierarchy set that is higher than the lowest hierarchy set sequentially performs decoding processing on said each picture.

5. A transmission apparatus, comprising:
circuitry configured
- to classify image data of each picture constituting moving image data into a plurality of hierarchies,
- to code the image data of the picture in each of the classified hierarchies,
- to divide the plurality of hierarchies into a predetermined number of hierarchy sets including a lowest hierarchy set,
- to generate a predetermined number of video streams having the coded image data of the picture in each of the divided hierarchy sets;
- to transmit a container including the generated predetermined number of video streams in a predetermined format, and
- to insert, in a layer of the container, identification information for identifying whether each of the predetermined number of video streams is a base stream having the coded image data of the picture in the lowest hierarchy set or an enhanced stream having the coded image data of the picture in a hierarchy set higher than the lowest hierarchy set, wherein the circuitry performs coding so that a decoding timing for the coded image data of the picture in the hierarchy set higher than the lowest hierarchy set is an average timing of decoding timings for the coded image data of the pictures in all hierarchy sets lower than the hierarchy set that is higher than the lowest hierarchy set such that a receiver having decoding capacity to decode both the picture in the hierarchy set higher than the lowest hierarchy set and the pictures in said all hierarchy sets lower than the hierarchy set that is higher than the lowest hierarchy set sequentially performs decoding processing on said each picture.

6. The transmission apparatus according to claim 5, wherein
the container is a transport stream, and
the circuitry inserts, as a stream type, the identification information in a video elementary stream loop arranged corresponding to each of the predetermined number of video streams under a program map table.

7. The transmission apparatus according to claim 5, wherein
the circuitry performs coding so that a decoding interval of the coded image data of the picture in at least the lowest hierarchy set is a regular interval.

8. A transmission apparatus, comprising:
circuitry configured
- to classify image data of each picture constituting moving image data into a plurality of hierarchies,
- to code the image data of the picture in each of the classified hierarchies,
- to divide the plurality of hierarchies into a predetermined number of hierarchy sets including a lowest hierarchy set,
- to generate a predetermined number of video streams having the coded image data of the picture in each of the divided hierarchy sets,
- to transmit a container including the generated predetermined number of video streams in a predetermined format; and
- to insert, in a layer of the container, configuration information of the video stream corresponding to each of the predetermined number of video streams included in the container, wherein the circuitry performs coding so that a decoding timing for the coded image data of the picture in a hierarchy set higher than the lowest hierarchy set is an average timing of decoding timings for the coded image data of the pictures in all hierarchy sets lower than the hierarchy set that is higher than the lowest hierarchy set such that a receiver having decoding capacity to decode both the picture in the hierarchy set higher than the lowest hierarchy set and the pictures in said all hierarchy sets lower than the hierarchy set that is higher than the lowest hierarchy set sequentially performs decoding processing on said each picture.

9. The transmission apparatus according to claim 8, wherein
the configuration information includes information representing a service group to which the video stream belongs.

10. The transmission apparatus according to claim 8, wherein
the configuration information includes information representing a dependence relationship between streams starting from the base stream having the coded image data of the picture in the lowest hierarchy set.

11. The transmission apparatus according to claim 8, wherein
the configuration information includes information representing the number of hierarchies of the plurality of hierarchies classified by the circuitry.

12. The transmission apparatus according to claim 8, wherein
the container is a transport stream, and
the circuitry inserts, as a descriptor, the configuration information in a video elementary stream loop arranged corresponding to each of the predetermined number of video streams under a program map table.

13. A reception apparatus, comprising:
circuitry configured
- to receive a predetermined number of video streams having coded image data of a picture in each of a predetermined number of hierarchy sets, the coded image data being obtained by classifying image data of pictures constituting moving image data into a plurality of hierarchies and coding the image data, the plurality of hierarchies being divided into the predetermined number of hierarchy sets including a lowest hierarchy set, and
- to process the received predetermined number of video streams, wherein at least a video stream of the predetermined number of video streams, which has coded image data of a picture in the lowest hierarchy set, is coded so that decoding interval for each picture is a regular interval, and the predetermined number of video streams is coded so that a decoding timing for the coded image data of the picture in a hierarchy set higher than the lowest hierarchy set is an average timing of decoding timings for the coded image data of the pictures in all hierarchy sets lower than the hierarchy set that is higher than the lowest hierarchy set such that the circuitry sequentially performs decoding processing on said each picture.

14. A reception apparatus, comprising:
circuitry configured
- to receive a predetermined number of video streams having coded image data of a picture in each of a predetermined number of hierarchy sets, the coded image data being obtained by classifying image data of pictures constituting moving image data into a plurality of hierarchies and coding the image data, the plurality of hierarchies being divided into the predetermined number of hierarchy sets including a lowest hierarchy set,
- to selectively take coded image data of a picture in a hierarchy that is equal to or lower than a predetermined hierarchy depending on a decoding capability in a buffer from the predetermined number of video streams included in a received container;
- to decode the coded image data of the picture taken in the buffer; and
- to acquire image data of the picture in the hierarchy that is equal to or lower than the predetermined hierarchy, wherein at least a video stream of the predetermined number of video streams, which has coded image data of a picture in the lowest hierarchy set, is coded so that decoding interval for each picture is a regular interval, and the predetermined number of video streams is coded so that a decoding timing for the coded image data of the picture in a hierarchy set higher than the lowest hierarchy set is an average timing of decoding timings for the coded image data of the pictures in all hierarchy sets lower than the hierarchy set that is higher than the lowest hierarchy set such that the circuitry sequentially performs decoding processing on said each picture.

15. The reception apparatus according to claim 14, wherein identification information for identifying whether each of the predetermined number of video streams is a base stream having the coded image data of the picture in the lowest hierarchy set or an enhanced stream having the coded image data of the picture in a hierarchy set higher than the lowest hierarchy set is inserted in a layer of the container, and the circuitry takes coded image data of a picture in a predetermined hierarchy set depending on the decoding capability in the buffer from the predetermined number of video streams including the base stream based on the identification information, and decodes it.

16. The reception apparatus according to claim 14, wherein in the case where the coded image data of the picture in the predetermined hierarchy set is included in a plurality of video streams, the circuitry decodes the coded image data of each picture as one stream based on decoding timing information.

17. The reception apparatus according to claim 14, wherein the circuitry is further configured to
match a frame rate of the image data of each picture acquired in the circuitry with a display capability.

* * * * *